United States Patent
Loccufier et al.

(10) Patent No.: US 8,978,554 B2
(45) Date of Patent: Mar. 17, 2015

(54) ALKALI SOLUBLE RESIN

(75) Inventors: Johan Loccufier, Zwijnaarde (BE);
Philippe Moriamé, Antwerp (BE);
Stefaan Lingier, Wondelgem (BE)

(73) Assignee: Agfa Graphics N.V., Mortsel (BE)

( * ) Notice: Subject to any disclaimer, the term of this patent is extended or adjusted under 35 U.S.C. 154(b) by 934 days.

(21) Appl. No.: 13/139,964

(22) PCT Filed: Jan. 12, 2010

(86) PCT No.: PCT/EP2010/050263
§ 371 (c)(1),
(2), (4) Date: Jun. 15, 2011

(87) PCT Pub. No.: WO2010/086211
PCT Pub. Date: Aug. 5, 2010

(65) Prior Publication Data
US 2011/0247516 A1     Oct. 13, 2011

Related U.S. Application Data

(60) Provisional application No. 61/149,030, filed on Feb. 2, 2009.

(30) Foreign Application Priority Data

Jan. 30, 2009 (EP) .................... 09151708

(51) Int. Cl.
| | | |
|---|---|---|
| B41M 1/06 | (2006.01) | |
| B41C 1/10 | (2006.01) | |
| G03F 7/004 | (2006.01) | |
| C08F 220/60 | (2006.01) | |
| C08F 220/56 | (2006.01) | |
| C08F 220/58 | (2006.01) | |

(52) U.S. Cl.
CPC ............ *C08F 220/60* (2013.01); *B41C 1/1008* (2013.01); *C08F 220/56* (2013.01); *B41C 1/1016* (2013.01); *C08F 220/58* (2013.01); *B41C 2201/02* (2013.01); *B41C 2201/14* (2013.01); *B41C 2210/02* (2013.01); *B41C 2210/06* (2013.01); *B41C 2210/22* (2013.01); *B41C 2210/24* (2013.01); *B41C 2210/262* (2013.01)
USPC ........... 101/451; 101/453; 101/467; 526/288; 430/270.1; 430/302

(58) Field of Classification Search
None
See application file for complete search history.

(56) References Cited

U.S. PATENT DOCUMENTS

| | | | |
|---|---|---|---|
| 3,850,633 A | | 11/1974 | Moraw et al. |
| 3,929,488 A | | 12/1975 | Smith |
| 4,045,232 A | | 8/1977 | Parkinson |
| 4,981,517 A | | 1/1991 | DeSanto, Jr. et al. |
| 5,340,699 A | | 8/1994 | Haley et al. |
| 5,582,952 A | | 12/1996 | Kawamura et al. |
| 5,641,608 A | | 6/1997 | Grunwald et al. |
| 6,140,392 A | | 10/2000 | Kingman et al. |
| 6,143,464 A | | 11/2000 | Kawauchi |
| 6,190,825 B1 | | 2/2001 | Denzinger et al. |
| 7,621,350 B2 | | 11/2009 | Richert |
| 8,105,202 B2 | | 1/2012 | Kojima et al. |
| 8,192,918 B2 | | 6/2012 | Loccufier et al. |
| 2010/0112476 A1* | | 5/2010 | Loccufier et al. .......... 430/270.1 |

FOREIGN PATENT DOCUMENTS

| | | |
|---|---|---|
| DE | 1 447 963 A1 | 11/1968 |
| DE | 40 074 428 A1 | 9/1991 |
| DE | 40 27 301 A1 | 3/1992 |
| DE | 44 45 820 A1 | 6/1996 |
| EP | 0 330 239 A2 | 8/1989 |
| EP | 0 400 706 A1 | 5/1990 |
| EP | 0 625 728 A2 | 11/1994 |
| EP | 0 823 327 A2 | 2/1998 |
| EP | 0 864 420 A1 | 2/1998 |
| EP | 0 894 622 A2 | 2/1999 |
| EP | 0 901 902 A2 | 3/1999 |

(Continued)

OTHER PUBLICATIONS

International Search Report in corresponding International Patent Application No. PCT/EP2010/050263, mailed Jun. 7, 2010.

(Continued)

*Primary Examiner* — Joshua D Zimmerman
(74) *Attorney, Agent, or Firm* — Leydig, Voit & Mayer, Ltd.

(57) ABSTRACT

An alkali soluble resin is disclosed comprising a first monomeric unit including at least one sulfonamide group and a second monomeric unit derived from the monomer according to the following structure (I) wherein $R^1$ represents a structural moiety comprising an ethylenically unsaturated polymerizable group; $R^2$, $R^3$ and $R^4$ independently represent hydrogen, an optionally substituted alkyl, alkenyl, alkynyl, alkaryl, aralkyl, aryl or heteroaryl group or, the necessary atoms to form a five to eight membered ring.

(I)

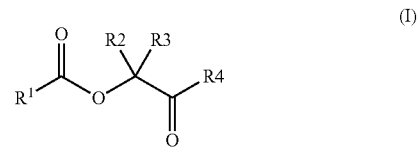

20 Claims, No Drawings

(56) References Cited

FOREIGN PATENT DOCUMENTS

| | | |
|---|---|---|
| EP | 0909657 A2 | 4/1999 |
| EP | 0 825 927 B1 | 8/1999 |
| EP | 0 933 682 A2 | 8/1999 |
| EP | 0934822 A1 | 8/1999 |
| EP | 0 950 517 A1 | 10/1999 |
| EP | 0950518 A1 | 10/1999 |
| EP | 0 978 376 A2 | 2/2000 |
| EP | 0 982 123 A2 | 3/2000 |
| EP | 1 025 992 A1 | 8/2000 |
| EP | 1 029 667 A1 | 8/2000 |
| EP | 1 053 868 A2 | 11/2000 |
| EP | 1 072 432 A2 | 1/2001 |
| EP | 1 093 934 A1 | 4/2001 |
| EP | 1120246 A2 | 8/2001 |
| EP | 1211065 A2 | 6/2002 |
| EP | 0887182 B1 | 7/2002 |
| EP | 1241003 A2 | 9/2002 |
| EP | 1275498 A2 | 1/2003 |
| EP | 1291172 A2 | 3/2003 |
| EP | 1 342 568 A1 | 9/2003 |
| EP | 1 356 926 A1 | 10/2003 |
| EP | 1 400 351 A2 | 3/2004 |
| EP | 1 208 014 B1 | 4/2004 |
| EP | 1433594 A2 | 6/2004 |
| EP | 1268660 B1 | 7/2004 |
| EP | 1439058 A2 | 7/2004 |
| EP | 1311394 B1 | 12/2004 |
| EP | 1 506 858 A2 | 2/2005 |
| EP | 1262318 B1 | 3/2005 |
| EP | 1263590 B1 | 3/2005 |
| EP | 1011970 B1 | 2/2006 |
| EP | 1299238 B1 | 2/2007 |
| EP | 1368413 B1 | 7/2008 |
| EP | 1 985 445 A1 | 10/2008 |
| EP | 2 080 616 A1 | 7/2009 |
| EP | 2159049 A1 | 3/2010 |
| GB | 1154749 | 6/1969 |
| WO | WO 97/39894 | 10/1997 |
| WO | WO 99/01795 | 1/1999 |
| WO | WO 99/21725 | 5/1999 |
| WO | WO 99/63407 | 12/1999 |
| WO | WO 00/29214 | 5/2000 |
| WO | WO 00/32705 | 6/2000 |
| WO | WO 01/09682 A2 | 2/2001 |
| WO | WO 01/45958 A2 | 6/2001 |
| WO | WO 01/96119 A1 | 12/2001 |
| WO | WO 02/053626 A1 | 7/2002 |
| WO | WO 02/053627 A1 | 7/2002 |
| WO | WO 03/074287 A1 | 9/2003 |
| WO | WO 2004/020484 A1 | 3/2004 |
| WO | WO 2004/033206 A1 | 4/2004 |
| WO | WO 2004/035310 A1 | 4/2004 |
| WO | WO 2004/035645 A1 | 4/2004 |
| WO | WO 2004/035686 A2 | 4/2004 |
| WO | WO 2004/035687 A1 | 4/2004 |
| WO | WO 2005/111727 A1 | 11/2005 |
| WO | WO 2006/005688 A1 | 1/2006 |
| WO | WO 2007/099047 A1 | 9/2007 |
| WO | WO 2009/005582 A1 | 1/2009 |
| WO | WO 2009/062857 A1 | 5/2009 |

OTHER PUBLICATIONS

International Preliminary Report on Patentability in corresponding International Patent Application No. PCT/EP2010/050263, mailed Aug. 2, 2011.

Morris, Thomas, et al., "A microwave enhanced cross-metathesis approach to peptidomimetics," *Organic & Biomolecular Chemistry*, vol. 5, No. 7, pp. 1025-1027 (2007).

* cited by examiner

ALKALI SOLUBLE RESIN

FIELD OF THE INVENTION

The present invention relates to a new alkali soluble resin and a lithographic printing plate precursor comprising said resin.

BACKGROUND OF THE INVENTION

Lithographic printing presses use a so-called printing master such as a printing plate which is mounted on a cylinder of the printing press. The master carries a lithographic image on its surface and a print is obtained by applying ink to said image and then transferring the ink from the master onto a receiver material, which is typically paper. In conventional, so-called "wet" lithographic printing, ink as well as an aqueous fountain solution (also called dampening liquid) are supplied to the lithographic image which consists of oleophilic (or hydrophobic, i.e. ink-accepting, water-repelling) areas as well as hydrophilic (or oleophobic, i.e. water-accepting, ink-repelling) areas. In so-called driographic printing, the lithographic image consists of ink-accepting and ink-adhesive (ink-repelling) areas and during driographic printing, only ink is supplied to the master.

Printing masters are generally obtained by the image-wise exposure and processing of an imaging material called plate precursor. In addition to the well-known photosensitive, so-called pre-sensitized plates, which are suitable for UV contact exposure through a film mask, also heat-sensitive printing plate precursors have become very popular in the late 1990s. Such thermal materials offer the advantage of daylight stability and are especially used in the so-called computer-to-plate method wherein the plate precursor is directly exposed, i.e. without the use of a film mask. The material is exposed to heat or to infrared light and the generated heat triggers a (physico-)chemical process, such as ablation, polymerization, insolubilization by cross linking of a polymer, heat-induced solubilization or particle coagulation of a thermoplastic polymer latex.

The most popular thermal plates form an image by a heat-induced solubility difference in an alkaline developer between exposed and non-exposed areas of the coating. The coating typically comprises an oleophilic binder, e.g. a phenolic resin, of which the rate of dissolution in the developer is either reduced (negative working) or increased (positive working) by the image-wise exposure. During processing, the solubility differential leads to the removal of the non-image (non-printing) areas of the coating, thereby revealing the hydrophilic support, while the image (printing) areas of the coating remain on the support. Typical examples of such plates are described in e.g. EP-A 625728, 823327, 825927, 864420, 894622 and 901902. Negative working embodiments of such thermal materials often require a pre-heat step between exposure and development as described in e.g. EP-625,728.

EP 1 985 445 discloses a lithographic printing plate precursor comprising on a support having a hydrophilic surface a coating comprising an IR absorbing agent and a contrast enhancing compound.

WO 2007/099047 discloses a heat-sensitive positive-working lithographic printing plate precursor comprising a support having a hydrophilic surface and a heat-sensitive coating comprising an IR absorbing agent, a phenolic resin and an alkaline soluble polymer comprising a specific monomeric unit including a sulfonamide group.

Unpublished patent application EP 8 105 202 discloses a heat-sensitive positive-working lithographic printing plate precursor comprising on a support having a hydrophilic surface, a heat-sensitive coating comprising an underlayer comprising a specific alkaline soluble polymer and an upperlayer comprising a phenolic resin.

Before, during and after the printing step, a lithographic printing plate is in general treated with various liquids such as for example ink and/or fountain solution or treating liquids for further improving the lithographic properties of the image and non-image areas. Ink and fountain solution for example, may attack the coating and may reduce the press life. It is of high importance that the coating is sufficiently resistant against the application of these variety of treating liquids or in other words, has a high chemical resistance. Furthermore, it is important that positive-working printing plate precursors based on a solubility difference exhibit a substantive differentiation between the development kinetics of exposed and non-exposed areas. In other words, the dissolution of the exposed areas in the developer should be completely finished before the unexposed areas also start dissolving in the developer. If this differentiation is not sufficiently pronounced, insufficient clean-out which may become apparent as a reduction of the sensitivity of the plate, toning (ink-acceptance in the non-image areas) and/or ink build-up on the blanket, may result. The low differentiation between the development kinetics of exposed and non-exposed areas may further lead to a loss of coating in the image areas, especially a loss of small image details or so-called high lights, a reduced press life and/or a reduced chemical resistance.

SUMMARY OF THE INVENTION

It is an object of the present invention to provide a new alkali soluble resin and to provide a positive-working lithographic printing plate with an excellent lithographic quality and a high chemical resistance. A printing plate with a high lithographic quality means a printing plate showing no stain on the plate after processing and no toning during printing. A high chemical resistance means that the coating is not, or substantially not affected by printing liquids such as the printing ink, e.g. UV curable printing ink, fountain solution, plate and blanket cleaner.

The objects of the present invention are realized by claims 1 and 12 respectively, i.e. an alkali soluble resin as defined in claim 1 characterized in that said resin comprises a first monomeric unit including at least one sulfonamide group and a second monomeric unit according to the following structure (I):

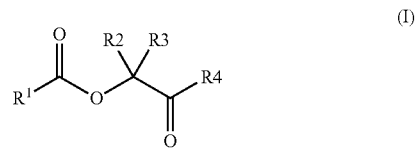

wherein
$R^1$ represents a structural moiety comprising an ethylenically unsaturated polymerisable group;
$R^2$, $R^3$ and $R^4$ independently represent hydrogen, an optionally substituted alkyl, alkenyl, alkynyl, alkaryl, aralkyl, aryl or heteroaryl group or the necessary atoms to form a five to eight membered ring; and a lithographic printing plate precursor as defined in claim 12 which comprises on a support having a hydrophilic surface or which is provided with a hydrophilic layer, a heat and/or light-sensitive coating including an infrared absorbing agent and the alkaline soluble resin according to structure (I).

It was surprisingly found that a printing plate precursor comprising the alkali soluble resin according to the invention, i.e. a resin comprising a first monomeric unit including at least one sulfonamide group and a second monomeric unit according to structure (I) as described above, results in a printing plate with excellent lithographic properties.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE INVENTION

The alkali soluble resin of the present invention includes a first monomeric unit containing at least one sulfonamide group, and a second monomeric unit derived from the monomer according to the following structure (I):

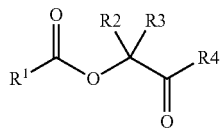

(I)

wherein $R^1$ represents a structural moiety comprising an ethylenically unsaturated polymerisable group;

$R^2$, $R^3$ and $R^4$ independently represent hydrogen, an optionally substituted alkyl group such as methyl, ethyl or propyl; an optionally substituted cycloalkyl group such as cyclopentyl, cyclohexyl, 1,3-dimethylcyclohexyl; an optionally substituted alkenyl, alkynyl, alkaryl, aralkyl or heteroaralkyl group, an optionally substituted aryl group such as benzene, naphthalene or antracene, or an optionally substituted heteroaryl aryl group such as furan, thiophene, pyrrole, pyrazole, imidazole, 1,2,3-triazole, 1,2,4-triazole, tetrazole, oxazole, isoxazole, triazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole; or the necessary atoms to form a five to eight membered ring.

Preferably, $R^2$ and $R^3$ in structure (I) independently represent hydrogen or an optionally substituted alkyl or aryl group, most preferably, $R^2$ and $R^3$ represent hydrogen. $R^4$ preferably represents an optionally substituted alkyl or aryl group.

The ethylenically unsaturated polymerisable group preferably represents an acrylate, a methacrylate, a styrene, a maleimide, an acrylamide or a methacrylamide group. An acrylamide and a methacrylamide group are particularly preferred.

In a preferred embodiment, the alkali soluble resin contains a second monomeric unit derived from the monomer according to structure (II):

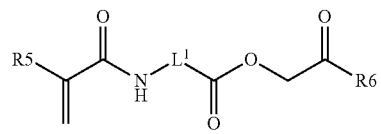

(II)

wherein $R^5$ represents hydrogen or an optionally substituted alkyl group such as a methyl, ethyl, propyl or isopropyl group;

$R^6$ represents hydrogen, an optionally substituted alkyl group such as a methyl, ethyl or propyl group; an optionally substituted cycloalkyl group such as a cyclopentyl, cyclohexyl, 1,3-dimethylcyclohexyl group; an optionally substituted alkenyl, alkynyl, alkaryl or aralkyl group, an optionally substituted aryl group such as benzene, naphthalene or antracene, or an optionally substituted heteroaryl group such as furan, thiophene, pyrrole, pyrazole, imidazole, 1,2,3-triazole, 1,2,4-triazole, tetrazole, oxazole, isoxazole, thiazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole; and $L^1$ represents a divalent linking group.

The optional substitutents on the alkyl, cycloalkyl, alkenyl, alkynyl, alkaryl or aralkyl, aryl or heteroaryl aryl groups may be selected from alkyl, cycloalkyl, alkenyl or cycloalkenyl group; an aryl or heteroaryl group; an alkylaryl or arylalkyl group; an alkoxy or aryloxy group; a thio alkyl, thio aryl or thio heteroaryl group; an alkyl ester of a hydroxyl, —SH, a carboxylic acid group; an alkyl ester of a sulphonic acid group; an alkyl ester of a phosphonic acid so group; an alkyl ester of a phosphoric acid group; an amino group; a nitro group; a nitrile group; a halogen; or a combination of at least two of these groups, including at least one of these groups which is further substituted by one of these groups.

Preferably, the linking group $L^1$ represents an alkylene, arylene, heteroarylene, —O—, —CO—, —CO—O—, —O—CO—, —CS—, —O—$(CH_2)_k$—, —$(CH_2)_k$—O—, —$(CH_2)_k$—O—CO—, —O—CO—$(CH_2)_k$—, —$(CH_2)_k$—O—CO—$(CH_2)_l$—, —$(CH_2)_k$—COO—, —CO—O—$(CH_2)_k$—, —$(CH_2)_k$—COO—$(CH_2)_l$—, —$(CH_2)_k$—NH—, —NH—$(CH_2)_k$—, —$(CH_2)_k$—CONH—, —$(CH_2)_k$—CONH—$SO_2$—, —NH—$(CH_2)_k$—O—$(CH_2)_l$—, —CO—$(CH_2)_k$, —$(CH_2)_k$—CO—, —CO—NH—, —NH—CO—, —NH—CO—O—, —O—CO—NH, —$(CH_2)_k$—CO—NH—, —NH—CO—$(CH_2)_k$—, —NH—CO—NH—, —NH—CS—NH—, or combinations thereof. K and l independently represent an integer equal to one or greater than one. Most preferred, the linking group $L^1$ represents an alkylene, arylene or heteroarylene group.

Without being limited thereto, typical examples of monomers according to general structure (I) and/or (II) are given below.

Monomer-1

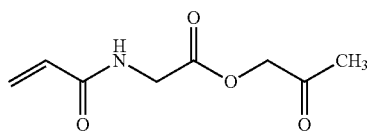

Monomer-2
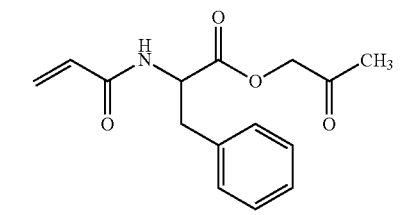

Monomer-3
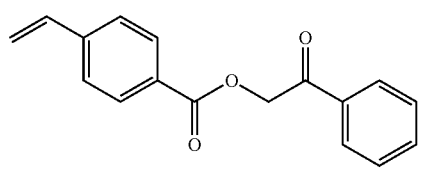

Monomer-4
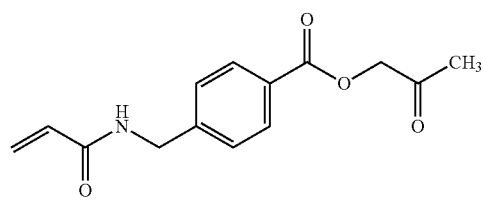

Monomer-5
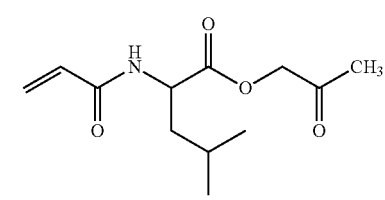

Monomer-6
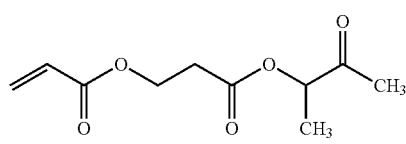

Monomer-7
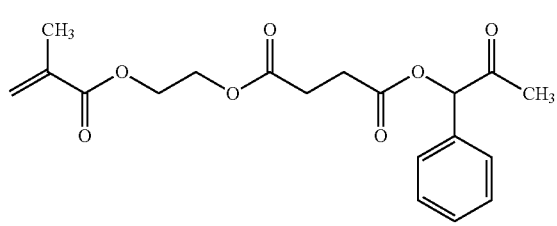

Monomer-8
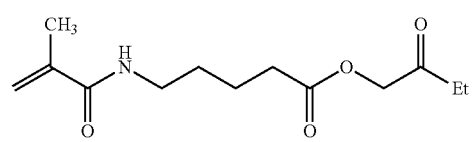

Monomer-9
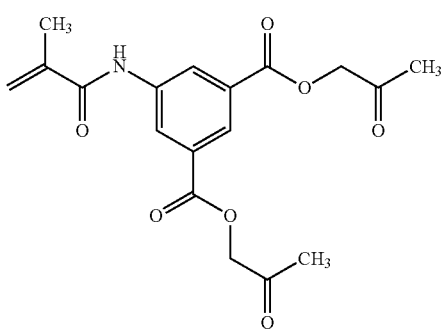

Monomer-10
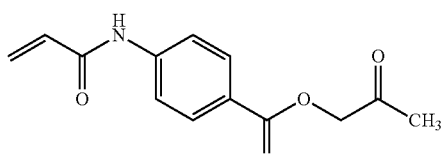

Monomer-11
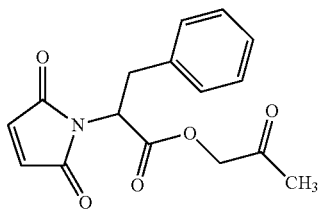

The first monomeric unit containing a sulfonamide group is a monomeric unit comprising a sulphonamide group represented by —NR$^j$—SO$_2$— or —SO$_2$—NR$^k$— wherein R$^j$ and R$^k$ each independently represent hydrogen, an optionally substituted alkyl, alkanoyl, alkenyl, alkynyl, cycloalkyl, heterocyclic, aryl, heteroaryl, aralkyl, heteroaralkyl group or combinations thereof.

In a preferred embodiment the monomeric unit containing a sulfonamide group is derived from the monomer according to structure (III):

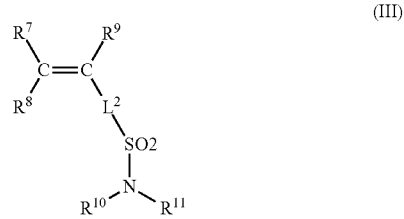
(III)

wherein
R$^7$, R$^8$ and R$^9$ independently represent hydrogen or an optionally alkyl group such as a methyl, ethyl, propyl or isopropyl group;
L$^2$ represents a divalent linking group; and
R$^{10}$ and R$^{11}$ represent hydrogen, an optionally substituted alkyl group such as a methyl, ethyl, propyl or isopropyl group; an optionally substituted cycloalkyl group such as a cyclopentyl, cyclohexyl, 1,3-dimethylcyclohexyl group, an optionally substituted alkenyl, alkynyl, alkaryl or aralkyl group, an optionally substituted aryl group such as benzene, naphthalene or antracene, or an optionally substituted heteroaryl aryl group such as furan, thiophene, pyrrole, pyrazole, imidazole, 1,2,3-triazole, 1,2,4-triazole, tetrazole, oxazole, isoxazole, triazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole.

Preferably $R^7$ and $R^8$ represent hydrogen and $R^9$ preferably represents hydrogen or an alkyl group.

Preferably, the linking group $L^2$ represents an alkylene, arylene, heteroarylene, —O—, —CO—, —CO—O—, —O—CO—, —CS—, —O—$(CH_2)_k$—, —$(CH_2)_k$—O—, —$(CH_2)_k$—O—CO—, —O—CO—$(CH_2)_k$—, —$(CH_2)_k$—O—CO—$(CH_2)_l$—, —$(CH_2)_k$—COO—, —CO—O—$(CH_2)_k$—, —$(CH_2)_k$—COO—$(CH_2)_l$—, —$(CH_2)_k$—NH—, —NH—$(CH_2)_k$—, —$(CH_2)_k$—CONH—, —$(CH_2)_k$—CONH—$SO_2$—, —NH—$(CH_2)_k$—O—$(CH_2)_l$—, —CO—$(CH_2)_k$, —$(CH_2)_k$—CO—, —CO—NH—, —NH—CO—, —NH—CO—O—, —O—CO—NH, —$(CH_2)_k$—CO—NH—, —NH—CO—$(CH_2)_k$—, —NH—CO—NH—, —NH—CS—NH—, or combinations thereof. K and l independently represent an integer equal to one or greater than one. Most preferably, the linking group $L^2$ represents an alkylene, arylene or heteroarylene group.

The optional substituents may be selected from an alkyl, cycloalkyl, alkenyl or cyclo alkenyl group, an aryl or heteroaryl group, an alkylaryl or arylalkyl group, an alkoxy or aryloxy group, a thio alkyl, thio aryl or thio heteroaryl group, a hydroxyl group, —SH, a carboxylic acid group or an alkyl ester thereof, a sulphonic acid group or an alkyl ester thereof, a phosphonic acid group or an alkyl ester thereof, a phosphoric acid group or an alkyl ester thereof, an amino group, a sulphonamide group, an amide group, a nitro group, a nitrile group a halogen or a combination of at least two of these groups, including at least one of these groups which is further substituted by one of these groups.

In a more preferred embodiment the first monomeric unit containing the sulfonamide group is derived from the monomer according to structure (IV):

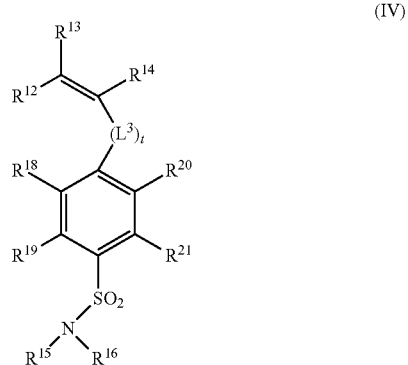

(IV)

wherein $R^{12}$, $R^{13}$ and $R^{14}$ independently represent hydrogen or an optionally substituted alkyl group such as methyl, ethyl or propyl group; and $L^3$ represents a divalent linking group; t represents 0, 1 or an integer greater 1;

$R^{15}$ or $R^{16}$ independently represent hydrogen, an optionally substituted alkyl, alkenyl, alkynyl, alkaryl, aralkyl group, an optionally substituted cycloalkyl group such as a cyclopentyl, cyclohexyl, 1,3-dimethylcyclohexyl group, an optionally substituted aryl group such as benzene, naphthalene or antracene or an optionally substituted heteroaryl aryl group such as furan, thiophene, pyrrole, pyrazole, imidazole, 1,2,3-triazole, 1,2,4-triazole, tetrazole, oxazole, isoxazole, thiazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole; and $R^{18}$, $R^{19}$, $R^{20}$ and $R^{21}$ independently represent an alkyl, cycloalkyl, alkenyl or cyclo alkenyl group, an alkoxy group, a thio alkyl group, a hydroxyl group, —SH, a carboxylic acid group or an alkyl ester thereof, a sulphonic acid group or an alkyl ester thereof, a phosphonic acid group or an alkyl ester thereof, a phosphoric acid group or an alkyl ester thereof, an amino group, a sulphonamide group, an amide group, a nitro group, a nitrile group or a halogen.

Preferably, the linking group $L^3$ represents an alkylene, arylene, heteroarylene, —O—, —CO—, —CO—O—, —O—CO—, —CS—, —O—$(CH_2)_k$—, —$(CH_2)_k$—O—, —$(CH_2)_k$—O—CO—, —O—CO—$(CH_2)_k$—, —$(CH_2)_k$—O—CO—$(CH_2)_l$—, —$(CH_2)_k$—COO—, —CO—O—$(CH_2)_k$—, —$(CH_2)_k$—COO—$(CH_2)_l$—, —$(CH_2)_k$—NH—, —NH—$(CH_2)_k$—, —$(CH_2)_k$—CONH—, —$(CH_2)_k$—CONH—$SO_2$—, —NH—$(CH_2)_k$—O—$(CH_2)_l$—, —CO—$(CH_2)_k$, —$(CH_2)_k$—CO—, —CO—NH—, —NH—CO—, —NH—CO—O—, —O—CO—NH, —$(CH_2)_k$—CO—NH—, —NH—CO—$(CH_2)_k$—, —NH—CO—NH—, —NH—CS—NH—, or combinations thereof. K and l independently represent an integer equal to one or greater than one.

The optional substituents may be selected from an alkyl, cycloalkyl, alkenyl or cyclo alkenyl group, an aryl or heteroaryl group, an alkylaryl or arylalkyl group, an alkoxy or aryloxy group, a thio alkyl, thio aryl or thio heteroaryl group, a hydroxyl group, —SH, a carboxylic acid group or an alkyl ester thereof, a sulphonic acid group or an alkyl ester thereof, a phosphonic acid group or an alkyl ester thereof, a phosphoric acid group or an alkyl ester thereof, an amino group, a sulphonamide group, an amide group, a nitro group, a nitrile group a halogen or a combination of at least two of these groups, including at least one of these groups which is further substituted by one of these groups.

Preferably, in structure (IV), $R^{12}$ and $R^{13}$ represent hydrogen and preferably $R^{14}$ hydrogen or an alkyl group. $R^{15}$ or $R^{16}$ preferably independently represent hydrogen, an alkyl, a cycloalkyl or aryl group. $L^3$ preferably represents an alkylene, arylene, heteroarylene, —CO—NH—, —CO—O— or combinations thereof, most preferably $L^3$ is absent.

Alternatively, the first monomeric unit containing the sulfonamide group is derived from the monomer according to structure (V):

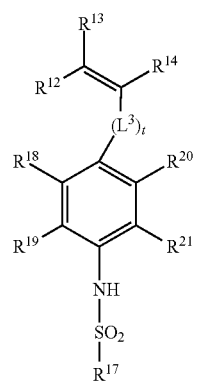

(V)

wherein $R^{12}$, $R^{13}$, $R^{14}$, $L^3$, t and $R^{18}$, $R^{19}$, $R^{20}$ and $R^{21}$ and the optional substituents are as described for structure IV; and $R^{17}$ represent an optionally substituted alkyl, alkenyl, alkynyl, alkaryl, aralkyl group, an optionally substituted cycloalkyl group such as a cyclopentyl, cyclohexyl, 1,3-dimethylcyclohexyl group, an optionally substituted aryl group such as benzene, naphthalene or antracene or an optionally substituted heteroaryl aryl group such as furan, thiophene, pyrrole, pyrazole, imidazole, 1,2,3-triazole, 1,2,4-triazole, tetrazole, oxazole, isoxazole, thiazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole.

Preferably, in structure (V), $R^{12}$ and $R^{13}$ represent hydrogen, preferably $R^{14}$ represent hydrogen or an alkyl group and $R^{17}$ preferably represents an alkyl, cycloalkyl or aryl group. The linking group $L^3$ preferably represents an alkylene, arylene, heteroarylene, —CO—NH—, —CO—O— or combinations thereof; most preferably $L^3$ is absent.

Further suitable examples of sulfonamide polymers and/or their method of preparation are disclosed in EP 933 682, EP 330 239, EP 894 622, EP 982 123, EP 1 072 432, WO is 99/63407 and EP 1 400 351.

Without being limited thereto, typical sulfonamide monomeric units according to the present invention are given below as monomers:

Sulfonamide Monomer-1

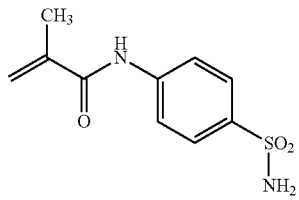

Sulfonamide Monomer-2

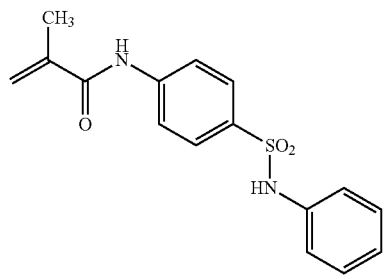

Sulfonamide Monomer-3

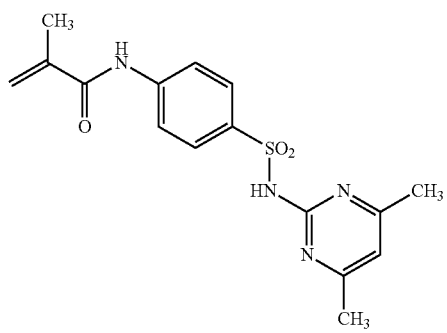

Sulfonamide Monomer-4

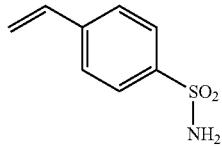

Sulfonamide Monomer-5

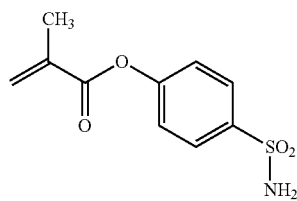

Sulfonamide Monomer-6

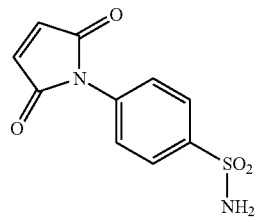

Sulfonamide Monomer-7

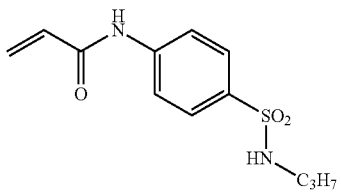

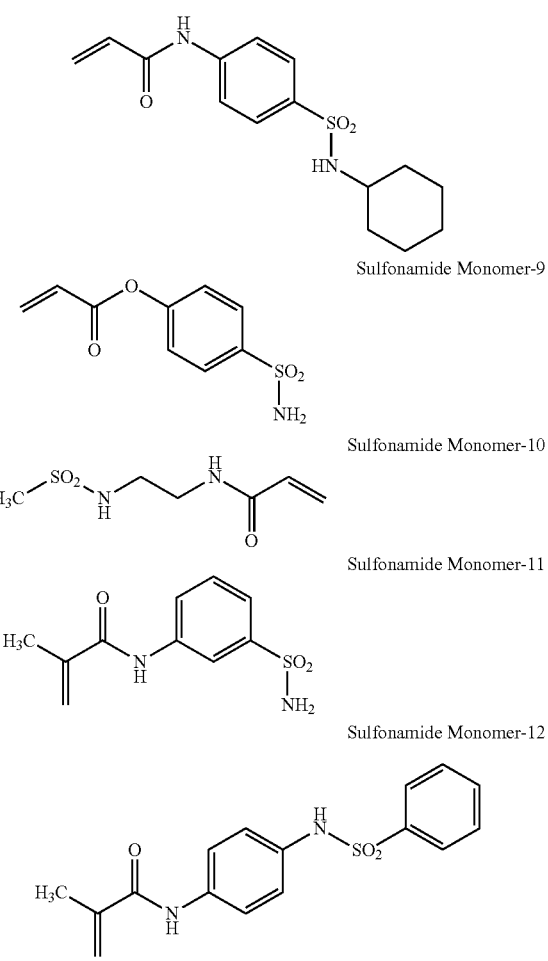

Sulfonamide Monomer-8

Sulfonamide Monomer-9

Sulfonamide Monomer-10

Sulfonamide Monomer-11

Sulfonamide Monomer-12

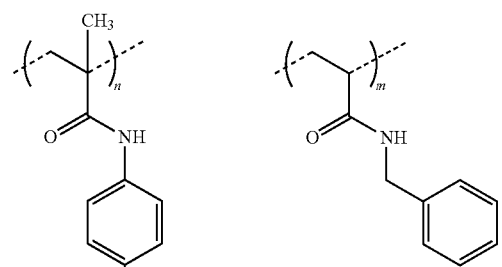

Resin-1

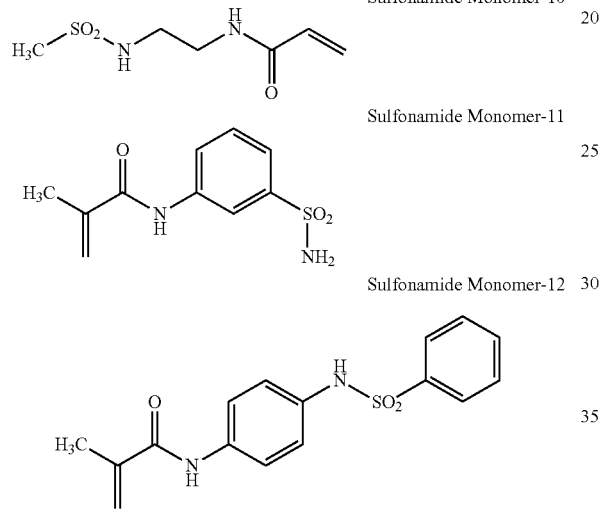

Resin-2

Resin-3

The alkali soluble binder according to the present invention may further comprise one or more other monomeric units, preferably selected from an alkyl or aryl (meth)acrylate such as methyl (meth)acrylate, ethyl (meth)acrylate, butyl (meth)acrylate, benzyl (meth)acrylate, 2-phenylethyl (meth)acrylate, hydroxylethyl (meth)acrylate, phenyl (meth)acrylate; (meth)acrylic acid; (meth)acrylamide; a N-alkyl or N-aryl (meth)acrylamide such as N-methyl (meth)acrylamide, N-ethyl (meth)acrylamide, N-phenyl (meth)acrylamide, N-benzyl (meth)acrylamide, N-methylol (meth)acrylamide, N-(4-hydroxyphenyl)(meth)acrylamide, N-(4-methylpyridyl)(meth)acrylate; (meth)acrylonitrile; styrene; a substituted styrene such as 2-, 3- or 4-hydroxy-styrene, 4-benzoic acid-styrene; N-(meth)acryloylaminoethyl phthalimide, a vinylpyridine such as 2-vinylpyridine, 3-vinylpyridine, 4-vinylpyridine; a substituted vinylpyridine such as 4-methyl-2-vinylpyridine; vinyl acetate, optionally the copolymerised vinyl acetate monomeric units are at least partially hydrolysed, forming an alcohol group, and/or at least partially reacted by an aldehyde compound such as formaldehyde or butyraldehyde, forming an acetal or butyral group; vinyl alcohol; vinyl acetal; vinyl butyral; a vinyl ether such as methyl vinyl ether; vinyl amide; a N-alkyl vinyl amide such as N-methyl vinyl amide, caprolactame, vinyl pyrrolydone; maleimide; a N-alkyl or N-aryl maleimide such as N-benzyl maleimide.

Without being limited thereto, typical generic structures of the alkali soluble resin according to the present invention are given below represented by their monomer composition.

-continued
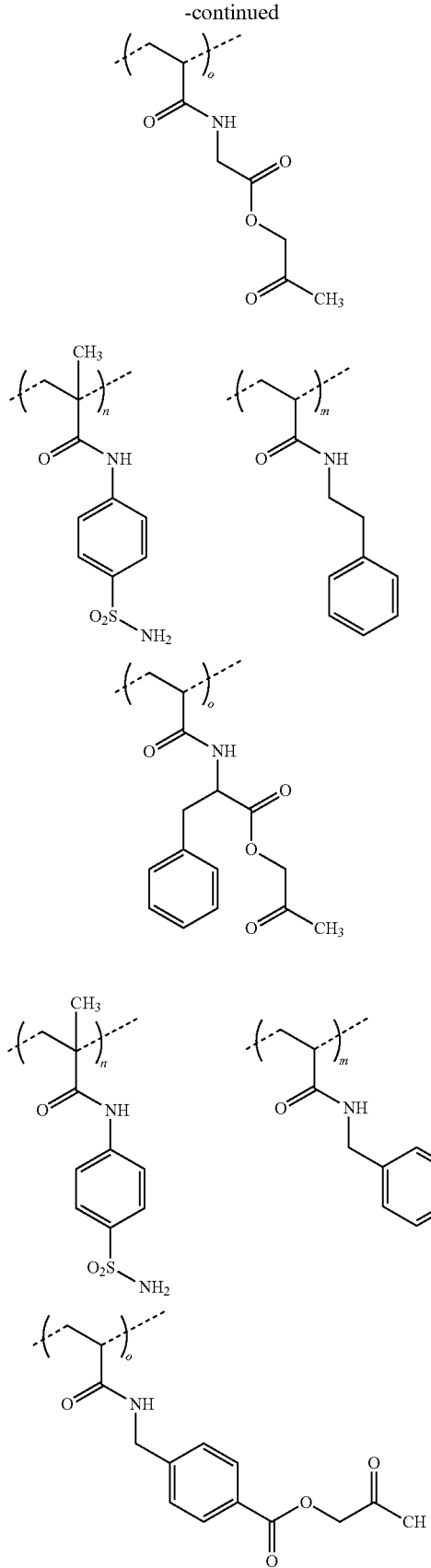
Resin-4
Resin-5
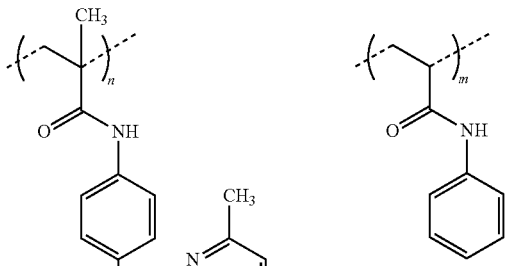
Resin-6
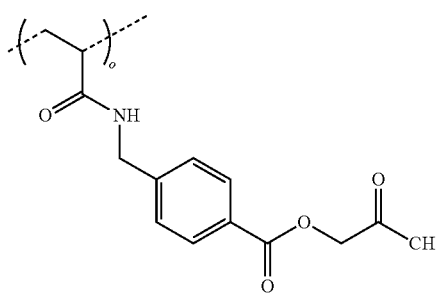
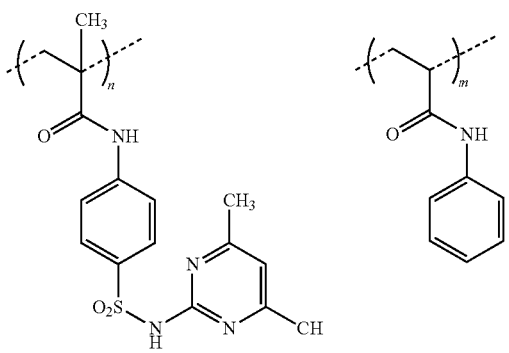
Resin-7
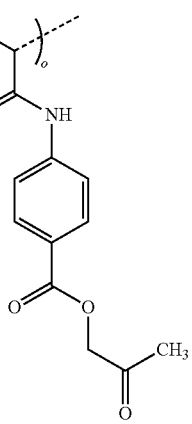

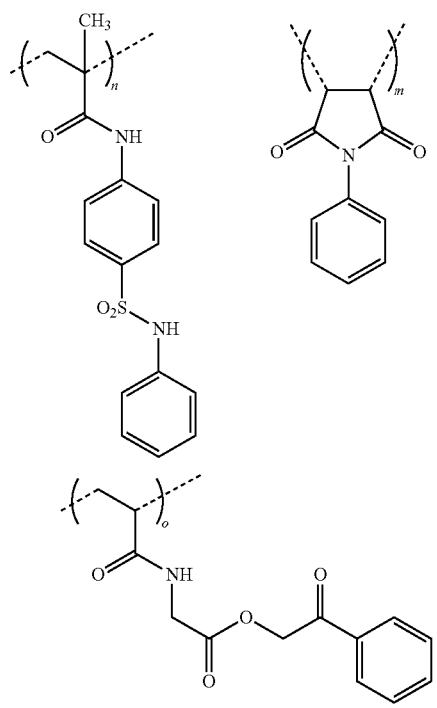
Resin-8
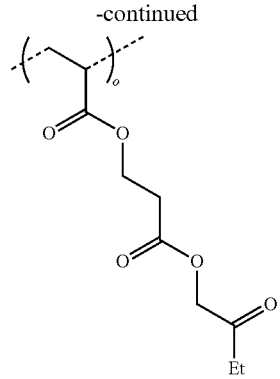
Resin-9
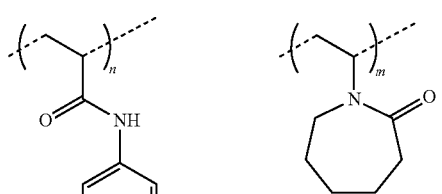
Resin-10
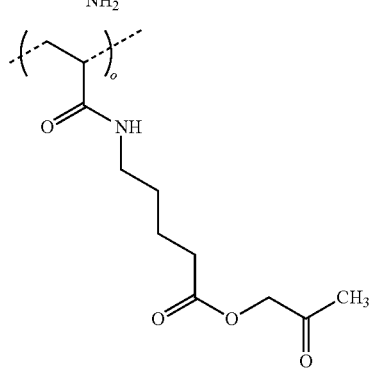
Resin-11
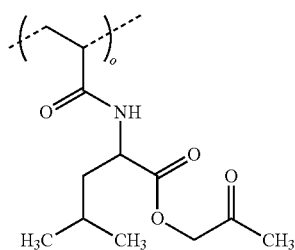
Resin-12

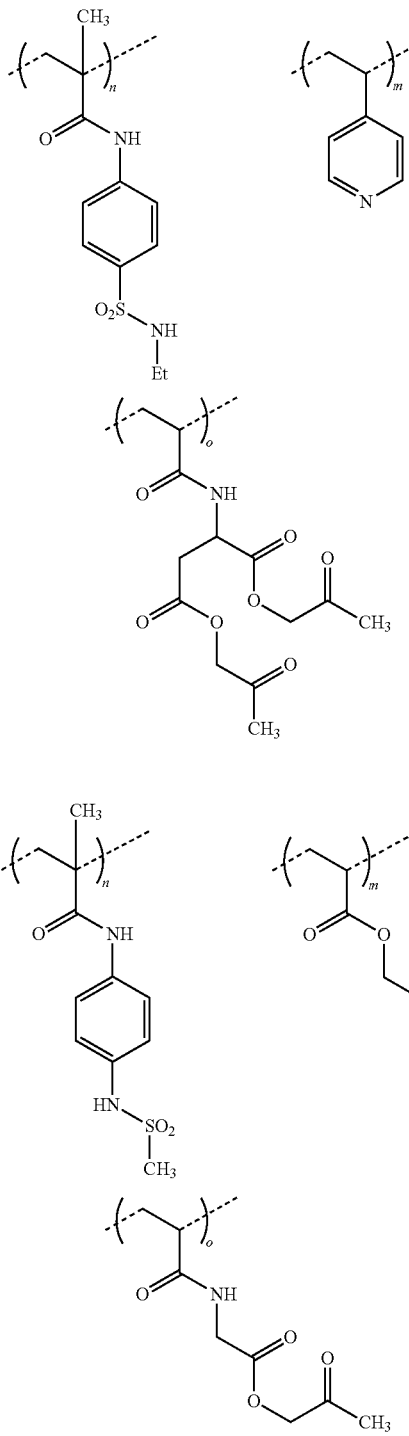

Resin-13

Resin-14

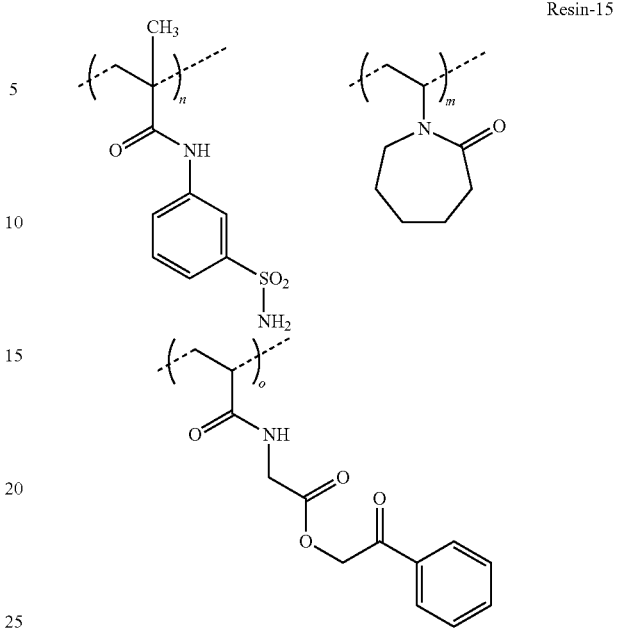

Resin-15

In each of the structures above m, n and o independently represent an integer ranging between 1 and 200, preferably an integer ranging between 2 and 150 and most preferably ranging between 4 and 100.

The alkali soluble polymer of the present invention has preferably a molecular weight ranging for $M_n$, i.e. number average molecular weight, between 10000 and 500000, more preferably between 10000 and 200000, most preferably between 10000 and 100000, and for $M_w$, i.e. weight average molecular weight, between 10000 and 1000000, more preferably between 20000 and 500000, most preferably between 20000 and 200000.

According to the present invention, there is also provided a lithographic printing plate precursor comprising on a support a heat and/or light sensitive coating comprising the alkali soluble resin according to structures (I) or (II) of the present invention. The printing plate is positive-working, i.e. after exposure and development the exposed areas of the coating are removed from the support and define hydrophilic (non-printing) areas, whereas the unexposed coating is not removed from the support and defines oleophilic (printing) areas. It was surprisingly found that the coating of a printing plate precursor comprising the alkali soluble resin of the present invention has, compared to resins of the prior art, an improved thermoresponsivity which may result in an improved developing latitude. An improved thermoresponsivity means that the difference in dissolution rate of the coating between the exposed and non-exposed areas is enhanced which results in an improved developing latitude.

Optionally, the coating may further comprise one or more binders selected from hydrophilic binders such as homopolymers and copolymers of vinyl alcohol, (meth)acrylamide, methylol (meth)acrylamide, (meth)acrylic acid, hydroxyethyl (meth)acrylate, maleic anhydride/vinylmethylether copolymers, copolymers of (meth)acrylic acid or vinylalcohol with styrene sulphonic acid; hydrophobic binders such as phenolic resins (e.g. novolac, resoles or polyvinyl phenols); chemically modified phenolic resins or polymers containing a carboxyl group, a nitrile group or a maleimide group as described in DE 4 007 428, DE 4 027 301 and DE 4 445 820;

polymers having an active imide group such as —SO₂—NH—CO—R$^h$—SO₂—NH—SO₂—R$^h$ or —CO—NH—SO₂—R$^h$ wherein R$^h$ represents an optionally substituted hydrocarbon group such as an optionally substituted alkyl, aryl, alkaryl, aralkyl or heteroaryl group; polymers comprising a N-benzyl-maleimide monomeric unit as described in EP 933 682, EP 894 622 (page 3 line 16 to page 6 line 30), EP 982 123 (page 3 line 56 to page 51 line 5), EP 1 072 432 (page 4 line 21 to page 10 line 29) and WO 99/63407 (page 4 line 13 to page 9 line 37); polymers having an acidic group which can be selected from polycondensates and polymers having free phenolic hydroxyl groups, as obtained, for example, by reacting phenol, resorcinol, a cresol, a xylenol or a trimethylphenol with aldehydes, especially formaldehyde, or ketones; condensates of sulfamoyl- or carbamoyl-substituted aromatics and aldehydes or ketones; polymers of bismethylol-substituted ureas, vinyl ethers, vinyl alcohols, vinyl acetals or vinylamides and polymers of phenylacrylates and copolymers of hydroxy-phenylmaleimides; copolymers comprising vinylacetals as described in EP 1 208 014 and WO2009/005582; polymers having units of vinylaromatics, N-aryl (meth)acrylamides or aryl (meth)acrylates containing optionally one or more carboxyl groups, phenolic hydroxyl groups, sulfamoyl groups or carbamoyl groups such as polymers having units of 2-hydroxyphenyl (meth)acrylate, of N-(4-hydroxyphenyl)(meth)acrylamide, of N-(4-sulfamoylphenyl)-(meth)acrylamide, of N-(4-hydroxy-3,5-dimethylbenzyl)-(meth)acrylamide, or 4-hydroxystyrene or of hydroxyphenylmaleimide; vinylaromatics, methyl (meth) acrylate, phenyl(meth)acrylate, benzyl (meth)acrylate, methacrylamide or acrylonitrile.

The amount of alkali soluble binder according to the present invention in the coating is preferably above 50% wt, more preferably above 75% wt and most preferably above 85% wt relative to the total weight of all ingredients in the layer comprising the alkali soluble binder.

The coating may comprise, besides the layer comprising the alkali soluble binder of the present invention—further also referred to as first layer—and optionally one or more additional binders, optional other layers. In a preferred embodiment, the coating comprises besides the first layer, a second layer comprising a phenolic resin located above said first layer; further referred to as upper layer. Said phenolic resin is an alkaline soluble oleophilic resin. The phenolic resin is preferably a novolac, a resol or a polyvinylphenolic resin; novolac is more preferred. Typical examples of such polymers are described in DE-A-4007428, DE-A-4027301 and DE-A-4445820. Other preferred polymers are phenolic resins wherein the phenyl group or the hydroxy group of the phenolic monomeric unit are chemically modified with an organic substituent as described in EP 894 622, EP 901 902, EP 933 682, WO99/63407, EP 934 822, EP 1 072 432, U.S. Pat. No. 5,641,608, EP 982 123, WO99/01795, WO04/035310, WO04/035686, WO04/035645, WO04/035687 or EP 1 506 858.

The novolac resin or resol resin may be prepared by polycondensation of at least one member selected from aromatic hydrocarbons such as phenol, o-cresol, p-cresol, m-cresol, 2,5-xylenol, 3,5-xylenol, resorcinol, pyrogallol, bisphenol, bisphenol A, trisphenol, o-ethylphenol, p-ethylphenol, propylphenol, n-butylphenol, t-butylphenol, 1-naphtol and 2-naphtol, with at least one aldehyde or ketone selected from aldehydes such as formaldehyde, glyoxal, acetoaldehyde, propionaldehyde, benzaldehyde and furfural and ketones such as acetone, methyl ethyl ketone and methyl isobutyl ketone, in the presence of an acid catalyst. Instead of formaldehyde and acetaldehyde, paraformaldehyde and paraldehyde may, respectively, be used.

The weight average molecular weight, measured by gel permeation chromatography using universal calibration and polystyrene standards, of the novolac resin is preferably from 500 to 150,000 g/mol, more preferably from 1,500 to 50,000 g/mol.

The poly(vinylphenol) resin may also be a polymer of one or more hydroxy-phenyl containing monomers such as hydroxystyrenes or hydroxy-phenyl (meth)acrylates. Examples of such hydroxystyrenes are o-hydroxystyrene, m-hydroxystyrene, p-hydroxystyrene, 2-(o-hydroxyphenyl)propylene, 2-(m-hydroxyphenyl)propylene and 2-(p-hydroxyphenyl)propylene. Such a hydroxystyrene may have a substituent such as chlorine, bromine, iodine, fluorine or a $C_{1-4}$ alkyl group, on its aromatic ring. An example of such hydroxy-phenyl (meth)acrylate is 2-hydroxy-phenyl methacrylate.

The poly(vinylphenol) resin may usually be prepared by polymerizing one or more hydroxy-phenyl containing monomer in the presence of a radical initiator or a cationic polymerization initiator. The poly(vinylphenol) resin may also be prepared by copolymerizing one or more of these hydroxy-phenyl containing monomers with other monomeric compounds such as acrylate monomers, methacrylate monomers, acrylamide monomers, methacrylamide monomers, vinyl monomers, aromatic vinyl monomers or diene monomers.

The weight average molecular weight, measured by gel permeation chromatography using universal calibration and polystyrene standards, of the poly(vinylphenol) resin is preferably from 1.000 to 200,000 g/mol, more preferably from 1,500 to 50,000 g/mol.

Examples of suitable phenolic resins are:
RESIN-01: ALNOVOL SPN452 is a solution of a novolac resin, 40% wt in Dowanol PM, obtained from CLARIANT GmbH. Dowanol PM consists of 1-methoxy-2-propanol (>99.5%) and 2-methoxy-1-propanol (<0.5%).
RESIN-02: ALNOVOL SPN400 is a solution of a novolac resin, 44% wt in Dowanol PMA, obtained from CLARIANT GmbH. Dowanol PMA consists of 2-methoxy-1-methyl-ethylacetate.
RESIN-03: ALNOVOL HPN100 a novolac resin obtained from CLARIANT GmbH.
RESIN-04: DURITE PD443 is a novolac resin obtained from BORDEN CHEM. INC.
RESIN-05: DURITE SD423A is a novolac resin obtained from BORDEN CHEM. INC.
RESIN-06: DURITE SD126A is a novolac resin obtained from BORDEN CHEM. INC.
RESIN-07: BAKELITE 6866LB02 is a novolac resin obtained from BAKELITE AG.
RESIN-08: BAKELITE 6866LB03 is a novolac resin obtained from BAKELITE AG.
RESIN-09: KR 400/8 is a novolac resin obtained from KOYO CHEMICALS INC.
RESIN-10: HRJ 1085 is a novolac resin obtained from SCHNECTADY INTERNATIONAL INC.
RESIN-11: HRJ 2606 is a phenol novolac resin obtained from SCHNECTADY INTERNATIONAL INC.
RESIN-12: LYNCUR CMM is a copolymer of 4-hydroxystyrene and methyl methacrylate obtained from SIBER HEGNER.

The dissolution behavior of the two-layer coating—i.e. the coating comprising the first layer and the upper layer and optionally other layers—in the developer can be fine-tuned by optional solubility regulating components. More particularly, development accelerators and development inhibitors can be used. These ingredients are preferably added to the upper layer.

Development accelerators are compounds which act as dissolution promoters because they are capable of increasing the dissolution rate of the coating. Developer resistance means, also called development inhibitors, are ingredients which are capable of delaying the dissolution of the unexposed areas during processing. The dissolution inhibiting effect is preferably reversed by heating, so that the dissolution of the exposed areas is not substantially delayed and a large dissolution differential between exposed and unexposed areas can thereby be obtained. The compounds described in e.g. EP 823 327 and WO 97/39894 are believed to act as dissolution inhibitors due to interaction, e.g. by hydrogen bridge formation, with the alkali-soluble resin(s) in the coating. Inhibitors of this type typically comprise at least one hydrogen bridge forming group such as nitrogen atoms, onium groups, carbonyl (—CO—), sulfinyl (—SO—) or sulfonyl (—SO$_2$—) groups and a large hydrophobic moiety such as one or more aromatic rings. Some of the compounds mentioned below, e.g. infrared dyes such as cyanines and contrast dyes such as quaternized triarylmethane dyes can also act as a dissolution inhibitor.

Other suitable inhibitors improve the developer resistance because they delay the penetration of the aqueous alkaline developer into the coating. Such compounds can be present in the first layer, the upper layer and/or in an optional second layer as described in e.g. EP 950 518, and/or in an optional development barrier layer on top of said layer as described in e.g. EP 864 420, EP 950 517, WO 99/21725 and WO 01/45958. In the latter embodiment, the solubility of the barrier layer in the developer or the penetrability of the barrier layer by the developer can be increased by exposure to heat or infrared light.

Preferred examples of inhibitors which delay the penetration of the aqueous alkaline developer into the coating include the following:
(a) A polymeric material which is insoluble in or impenetrable by the developer, e.g. a hydrophobic or water-repellent polymer or copolymer such as acrylic polymers, polystyrene, styrene-acrylic copolymers, polyesters, polyamides, polyureas, polyurethanes, nitrocellulosics and epoxy resins; or polymers comprising siloxane (silicones) and/or perfluoroalkyl units.
(b) Bifunctional compounds such as surfactants comprising a polar group and a hydrophobic group such as a long chain hydrocarbon group, a poly- or oligosiloxane and/or a perfluorinated hydrocarbon group. A typical example is Megafac F-177, a perfluorinated surfactant available from Dainippon Ink & Chemicals, Inc. A suitable amount of such compounds is between 10 and 100 mg/m$^2$, more preferably between 50 and 90 mg/m$^2$.
(c) Bifunctional block-copolymers comprising a polar block such as a poly- or oligo (alkylene oxide) and a hydrophobic block such as a long chain hydrocarbon group, a poly- or oligosiloxane and/or a perfluorinated hydrocarbon group. A suitable amount of such compounds is between 0.5 and 25 mg/m$^2$, preferably between 0.5 and 15 mg/m$^2$ and most preferably between 0.5 and 10 mg/m$^2$. A suitable copolymer comprises about 15 to 25 siloxane units and 50 to 70 alkyleneoxide groups. Preferred examples include copolymers comprising phenylmethylsiloxane and/or dimethylsiloxane as well as ethylene oxide and/or propylene oxide, such as Tego Glide 410, Tego Wet 265, Tego Protect 5001 or Silikophen P50/X, all commercially available from Tego Chemie, Essen, Germany. Said poly- or oligosiloxane may be a linear, cyclic or complex cross-linked polymer or copolymer. The term polysiloxane compound shall include any compound which contains more than one siloxane group —Si(R,R')—O—, wherein R and R' are optionally substituted alkyl or aryl groups. Preferred siloxanes are phenylalkylsiloxanes and dialkylsiloxanes. The number of siloxane groups in the polymer or oligomer is at least 2, preferably at least 10, more preferably at least 20. It may be less than 100, preferably less than 60.

It is believed that during coating and drying, the above mentioned inhibitor of type (b) and (c) tends to position itself, due to its bifunctional structure, at the interface between the coating and air and thereby forms a separate top layer even when applied as an ingredient of the coating solution of the first layer, the upper layer and/or an optional second layer. Simultaneously, the surfactants also act as a spreading agent which improves the coating quality. The separate top layer thus formed seems to be capable of acting as the above mentioned barrier layer which delays the penetration of the developer into the coating.

Alternatively, the inhibitor of type (a) to (c) can be applied in a separate solution, coated on top of the upper layer and/or other layers of the coating. In that embodiment, it may be advantageous to use a solvent in the separate solution that is not capable of dissolving the ingredients present in the other layers so that a highly concentrated water-repellent or hydrophobic phase is obtained at the top of the coating which is capable of acting as the above mentioned development barrier layer.

The coating of the heat-sensitive printing plate precursors described above preferably also contains an infrared light absorbing dye or pigment which may be present in the first layer, or if present, in the upper layer and/or in an optional other layer. Preferred IR absorbing dyes are cyanine dyes, merocyanine dyes, indoaniline dyes, oxonol dyes, pyrilium dyes and squarilium dyes. Examples of suitable IR dyes are described in e.g. EP-As 823327, 978376, 1029667, 1053868, 1093934; WO 97/39894 and 00/29214. A preferred compound is the following cyanine dye:

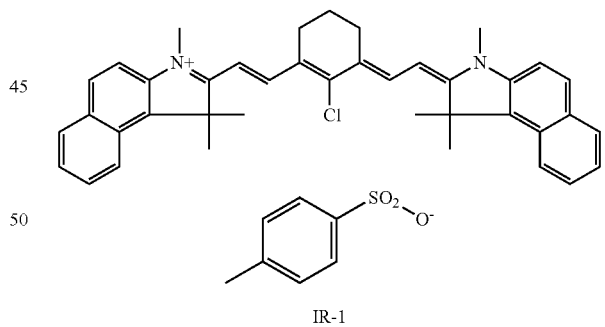

IR-1

The concentration of the IR-dye in the coating is preferably between 0.25 and 15.0% wt, more preferably between 0.5 and 10.0% wt, most preferably between 1.0 and 7.5% wt relative to the coating as a whole.

The coating may further comprise one or more colorant(s) such as dyes or pigments which provide a visible color to the coating and which remain in the coating at the image areas which are not removed during the processing step. Thereby a visible image is formed and examination of the lithographic image on the developed printing plate becomes feasible. Such dyes are often called contrast dyes or indicator dyes. These colorants may be present in the image-recording layer, and if present, in the upper layer or in an optional other layer. Preferably, the dye has a blue color and an absorption maximum in the wavelength range between 600 nm and 750 nm. Typical examples of such contrast dyes are the amino-substituted trior diarylmethane dyes, e.g. crystal violet, methyl violet, victoria pure blue, flexoblau 630, basonylblau 640, auramine and malachite green. Also the dyes which are discussed in depth in EP-A 400,706 are suitable contrast dyes. Dyes which, combined with specific additives, only slightly color the coating but which become intensively colored after exposure, as described in for example WO2006/005688 may also be used as colorants.

Optionally, the coating may contain other additional ingredients in the first layer, and if present in the upper layer or in an optional other layer. For example, polymer particles such as matting agents and spacers, surfactants such as perfluorosurfactants, silicon or titanium dioxide particles, metal complexing agents and polymers that further improve the run length and/or the chemical resistance of the plate such as polymers comprising imido (—CO—NR—CO—) pendant groups, wherein R is hydrogen, an optionally substituted alkyl or an optionally substituted aryl such as the polymers described in EP 894 622, EP 901 902, EP 933 682 and WO 99/63407, are well-known components of lithographic coatings.

To protect the surface of the coating, in particular from mechanical damage, a protective layer may optionally be applied on top of the coating; thus above the first, the optional upper layer or optional other layer. The protective layer generally comprises at least one water-soluble polymeric binder, such as polyvinyl alcohol, polyvinylpyrrolidone, partially hydrolyzed polyvinyl acetates, gelatin, carbohydrates or hydroxyethylcellulose. The protective layer may contain small amounts, i.e. less then 5% by weight, of organic solvents. The thickness of the protective layer is not particularly limited but preferably is up to 5.0 µm, more preferably from 0.05 to 3.0 µm, particularly preferably from 0.10 to 1.0 µm.

The coating may further contain other additional layer(s) such as for example an adhesion-improving layer located between the image-recording layer and the support.

The lithographic printing plate of the present invention comprises a support which has a hydrophilic surface or which is provided with a hydrophilic layer. The support may be a sheet-like material such as a plate or it may be a cylindrical element such as a sleeve which can be slid around a print cylinder of a printing press. Preferably, the support is a metal support such as aluminum or stainless steel. The support can also be a laminate comprising an aluminum foil and a plastic layer, e.g. polyester film.

A particularly preferred lithographic support is an electrochemically grained and anodized aluminum support. The aluminum support has usually a thickness of about 0.1-0.6 mm. However, this thickness can be changed appropriately depending on the size of the printing plate used and/or the size of the plate-setters on which the printing plate precursors are exposed. The aluminium is preferably grained by electrochemical graining, and anodized by means of anodizing techniques employing phosphoric acid or a sulphuric acid/phosphoric acid mixture. Methods of both graining and anodization of aluminum are very well known in the art.

By graining (or roughening) the aluminum support, both the adhesion of the printing image and the wetting characteristics of the non-image areas are improved. By varying the type and/or concentration of the electrolyte and the applied voltage in the graining step, different type of grains can be obtained. The surface roughness is often expressed as arithmetical mean center-line roughness Ra (ISO 4287/1 or DIN 4762) and may vary between 0.05 and 1.5 µm. The aluminum substrate of the current invention has preferably an Ra value below 0.45 µm, more preferably below 0.40 µm and most preferably below 0.30 µm. The lower limit of the Ra value is preferably about 0.1 µm. More details concerning the preferred Ra values of the surface of the grained and anodized aluminum support are described in EP 1 356 926.

By anodising the aluminum support, its abrasion resistance and hydrophilic nature are improved. The microstructure as well as the thickness of the $Al_2O_3$ layer are determined by the anodising step, the anodic weight (g/m$^2$ $Al_2O_3$ formed on the aluminium surface) varies between 1 and 8 g/m$^2$. The anodic weight is preferably ≥3 g/m$^2$, more preferably ≥3.5 g/m$^2$ and most preferably ≥4.0 g/m$^2$.

The grained and anodized aluminum support may be subject to a so-called post-anodic treatment to improve the hydrophilic properties of its surface. For example, the aluminum support may be silicated by treating its surface with a sodium silicate solution at elevated temperature, e.g. 95° C. Alternatively, a phosphate treatment may be applied which involves treating the aluminum oxide surface with a phosphate solution that may further contain an inorganic fluoride. Further, the aluminum oxide surface may be rinsed with a citric acid or citrate solution. This treatment may be carried out at room temperature or may be carried out at a slightly elevated temperature of about 30 to 50° C. A further interesting treatment involves rinsing the aluminum oxide surface with a bicarbonate solution. Still further, the aluminum oxide surface may be treated with polyvinylphosphonic acid, polyvinylmethylphosphonic acid, phosphoric acid esters of polyvinyl alcohol, polyvinylsulphonic acid, polyvinylbenzenesulphonic acid, sulphuric acid esters of polyvinyl alcohol, and acetals of polyvinyl alcohols formed by reaction with a sulphonated aliphatic aldehyde.

Another useful post-anodic treatment may be carried out with a solution of polyacrylic acid or a polymer comprising at least 30 mol % of acrylic acid monomeric units, e.g. GLASCOL E15, a polyacrylic acid, commercially available from Ciba Speciality Chemicals.

The support can also be a flexible support, which may be provided with a hydrophilic layer, hereinafter called 'base layer'. The flexible support is e.g. paper, plastic film or aluminum. Preferred examples of plastic film are polyethylene terephthalate film, polyethylene naphthalate film, cellulose acetate film, polystyrene film, polycarbonate film, etc. The plastic film support may be opaque or transparent.

The base layer is preferably a cross-linked hydrophilic layer obtained from a hydrophilic binder cross-linked with a hardening agent such as formaldehyde, glyoxal, polyisocyanate or a hydrolyzed tetra-alkylorthosilicate. The latter is particularly preferred. The thickness of the hydrophilic base layer may vary in the range of 0.2 to 25 µm and is preferably 1 to 10 µm. More details of preferred embodiments of the base layer can be found in e.g. EP-A 1 025 992.

Any coating method can be used for applying two or more coating solutions to the hydrophilic surface of the support. The multi-layer coating can be applied by coating/drying each layer consecutively or by the simultaneous coating of several coating solutions at once. In the drying step, the volatile solvents are removed from the coating until the coating is self-supporting and dry to the touch. However it is not necessary (and may not even be possible) to remove all the solvent in the drying step. Indeed the residual solvent content may be regarded as an additional composition variable by means of which the composition may be optimized. Drying is typically carried out by blowing hot air onto the coating, typically at a temperature of at least 70° C., suitably 80-150°

C. and especially 90-140° C. Also infrared lamps can be used. The drying time may typically be 15-600 seconds.

The heat-sensitive plate precursor can be image-wise exposed directly with heat, e.g. by means of a thermal head, or indirectly by infrared light, preferably near infrared light. The infrared light is preferably converted into heat by an IR light absorbing compound as discussed above. The heat-sensitive lithographic printing plate precursor is preferably not sensitive to visible light, i.e. no substantial effect on the dissolution rate of the coating in the developer is induced by exposure to visible light. Most preferably, the coating is not sensitive to ambient daylight.

The printing plate precursors of the present invention can be exposed to infrared light by means of e.g. LEDs or an infrared laser. Preferably lasers, emitting near infrared light having a wavelength in the range from about 700 to about 1500 nm, e.g. a semiconductor laser diode, a Nd:YAG or a Nd:YLF laser, are used. Most preferably, a laser emitting in the range between 780 and 830 nm is used. The required laser power depends on the sensitivity of the image-recording layer, the pixel dwell time of the laser beam, which is determined by the spot diameter (typical value of modern plate-setters at $1/e^2$ of maximum intensity: 10-25 μm), the scan speed and the resolution of the exposure apparatus (i.e. the number of addressable pixels per unit of linear distance, often expressed in dots per inch or dpi; typical value: 1000-s 4000 dpi).

Two types of laser-exposure apparatuses are commonly used: internal (ITD) and external drum (XTD) plate-setters. ITD plate-setters for thermal plates are typically characterized by a very high scan speed up to 1500 m/sec and may require a laser power of several Watts. The Agfa Galileo T (trademark of Agfa Graphics N.V.) is a typical example of a plate-setter using the ITD-technology. XTD plate-setters for thermal plates having a typical laser power from about 20 mW to about 500 mW operate at a lower scan speed, e.g. from 0.1 is to 20 m/sec. The Agfa Xcalibur, Accento and Avalon plate-setter families (trademark of Agfa Gevaert N.V.) make use of the XTD-technology.

The printing plate precursor, after exposure, is developed off press by means of a suitable processing liquid. The printing plate precursor is positive working and relies on heat-induced solubilization of the resin of the present invention. The resin is a polymer that is soluble in an aqueous developer, preferably an aqueous alkaline developing solution with a pH between 7.5 and 14.

In the development step, the non-image areas of the coating are removed by immersion in an aqueous alkaline developer, which may be combined with mechanical rubbing, e.g. by a rotating brush. The developer comprises an alkaline agent which may be an inorganic alkaline agent such as an alkali metal hydroxide, an organic alkaline agent such as an amine, and/or an alkaline silicate such as an alkali metal silicate or an alkali metal metasilicate. The developer preferably has a pH above 10, more preferably above 12. The developer may further contain components such as a buffer substance, a complexing agent, an antifoaming agent, an organic solvent, a corrosion inhibitor, a dye, an antisludge agent, a dissolution preventing agent such as a non-ionic surfactant, an anionic, cationic or amphoteric surfactant and/or a hydrotropic agent as known in the art. The developer may further contain a poly-hydroxyl compound such as e.g. sorbitol, preferably in a concentration of at least 40 g/l, and also a polyethylene oxide containing compound such as e.g. Supronic B25, commercially available from RHODIA, preferably in a concentration of at most 0.15 g/l. The solubility of the components present in the developer solution and/or the stability of a developer solution may be improved by adding lithium ions at a concentration of at least 0.05% wt and a salt of an aliphatic carboxylic acid provided that the molar ratio of the aliphatic carboxylic acid to the lithium ions is ≥1, as described in unpublished application PCT/EP2008/064898. During development, any water-soluble protective layer present is also removed.

The development step may be followed by a rinsing step and/or a gumming step. The gumming step involves post-treatment of the lithographic printing plate with a gum solution. A gum solution is typically an aqueous liquid which comprises one or more surface protective compounds that are capable of protecting the lithographic image of a printing plate against contamination or damaging. Suitable examples of such compounds are film-forming hydrophilic polymers or surfactants. A suitable gum solution which can be used after the development step is described in for example EP-A 1 342 568 and WO 2005/111727.

The plate precursor can, if required, be post-treated with a suitable correcting agent or preservative as known in the art. To increase the resistance of the finished printing plate and hence to extend its presslife capability (run length), the layer can be briefly heated to elevated temperatures ("baking"). The plate can be dried before baking or is dried during the baking process itself. During the baking step, the plate can be heated at a temperature which is higher than the glass transition temperature of the heat-sensitive coating, e.g. between 100° C. and 230° C. for a period of 40 seconds to 5 minutes. Baking can be done in conventional hot air ovens or by irradiation with lamps emitting in the infrared or ultraviolet spectrum. As a result of this baking step, the resistance of the printing plate to plate cleaners, correction agents and UV-curable printing inks increases. Such a thermal post-treatment is described, inter alia, in DE 1,447,963 and GB 1,154,749.

The printing plate thus obtained can be used for conventional, so-called wet offset printing, in which ink and an aqueous dampening liquid is supplied to the plate. Another suitable printing method uses a so-called single-fluid ink without a dampening liquid. Suitable single-fluid inks have been described in U.S. Pat. No. 4,045,232; U.S. Pat. No. 4,981,517 and U.S. Pat. No. 6,140,392. In a most preferred embodiment, the single-fluid ink comprises an ink phase, also called the hydrophobic or oleophilic phase, and a polyol phase as described in WO 00/32705

EXAMPLES

1. Synthesis of Monomers-1 and 2, Comparative Monomers-5 and 6

Monomer-1:

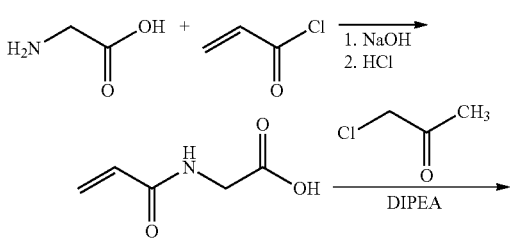

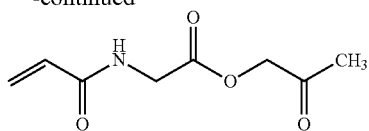

7.5 g (0.1 mol) mol) glycine was dissolved in 100 ml 2 N NaOH. The solution was cooled to 0° C. and 10.8 g (0.12 mol) acryloyl chloride was added dropwise over 45 minutes, while the temperature was kept below 10° C. The reaction was allowed to continue for one hour at 10° C. The reaction mixture was extracted 2 times with 50 ml tert. butyl methyl ether. The pH was adjusted to pH=3, using a concentrated hydrochloric acid solution and the reaction mixture was saturated with sodium chloride. The mixture was extracted 5 times with 100 ml n.-pentanol. The pooled n.-pentanol fractions were dried over $Na_2SO_4$ and evaporated under reduced pressure, after addition of a small fraction BHT as stabilizer. 4.2 g (32.5%) of N-acryloyl-glycine was isolated (m.p. 124-126° C.). N-acryloyl-glycine is Comparative Monomer 5 (see below).

9 g (0.069 mol) N-acryloyl-glycine was dissolved in 220 ml aceton. 0.3 g BHT, 13.44 g (0.104 mol) diisopropyl ethyl amine and 9.6 g (0.104 mol) chloro-acetone were added. The mixture was heated to 60° C. for 3 hours. The reaction mixture was allowed to cool down to room temperature and the precipitated salts were removed by filtration. The solvent was removed under reduced pressure and the residue was dissolved in 200 ml n.-pentanol. The mixture was extracted four times with brine and the solvent was evaporated under reduced pressure. The crude monomer 1 was purified by preparative column chromatography on a Merck SVP D40 column, using a gradient elution from methylene chloride to methylene chloride/methanol 95/5 at a flow rate of 40 ml per minute. 5.6 g (44%) of Monomer-1 (m.p. 116° C.) was isolated.

Monomer-2:

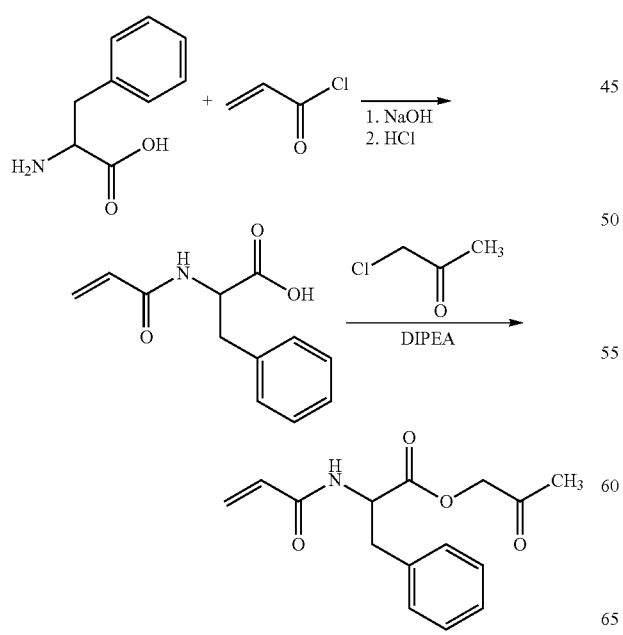

35.8 g (0.216 mol) phenyl alanine was dissolved in 216 ml 2N NaOH. The reaction mixture was cooled to 0° C. 23.44 g (0.259 mol) acryloyl chloride was added dropwise over 30 minutes, while the temperature was kept below 10° C. The reaction was allowed to continue over night at room temperature. The precipitated crude N-acryloyl-phenylalanine was isolated by filtration. A second fraction was isolated by first diluting the filtrate with 600 ml water followed by the addition of 1200 ml acetone. The precipitated salts were removed by filtration and the filtrate was evaporated under reduced pressure. Both fractions were separately heated in 600 ml acetone. The residual salts were removed by filtration and both filtrates were combined. The solvent was removed under reduced pressure and 12.6 g (26.5%) of N-acryloyl-phenylalanine was isolated (m.p. 136-138° C.). N-acryloyl-phenylalanine is Comparative Monomer 6 (see below).

5.7 g (26 mmol) N-acryloyl-phenylalanine and 4.0 g (31 mmol) diisopropyl ethyl amine were dissolved in 60 ml acetone. 2.86 g (31 mmol) chloro-acetone was added at room temperature and the reaction mixture was heated to reflux for 8 hours. The solvent was evaporated under reduced pressure. The oily residue was treated with 400 ml !N HCl and further diluted with 200 ml ice/water. Upon stirring, monomer 2 crystallized, was isolated by filtration, washed until neutral and dried. 6.8 g (93%) of Monomer-2 was isolated (m.p. 114-116° C.).

2. Synthesis of Comparative Monomers-3 to 6

The Comparative Monomers 3 and 4 can be prepared according to known procedures (Morris T. et al, Organic & Biomolecular Chemistry (2007), 5(7), 1025-1027). The synthesis of Comparative Monomers 5 and 6 has been described above (intermediate products in the synthesis of Inventive Monomers 1 and 2 respectively).

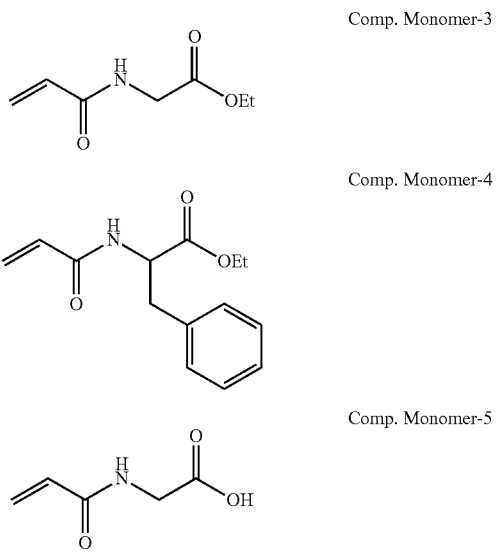

Comp. Monomer-6

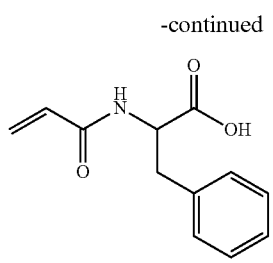

3. Synthesis of Phenetyl Acrylamide

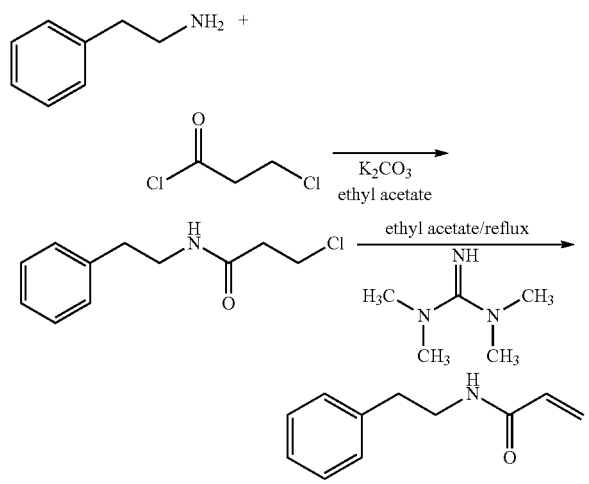

242.4 g (2 mol) phenetyl amine was dissolved in 1600 ml ethyl acetate. A solution of 331.7 g (2.4 mol) potassium carbonate in 800 ml water was added and the mixture was stirred intensively. The reaction mixture was cooled to 0° C. and a solution of 266.7 g (2.1 mol) 3-chloropropionyl chloride in 250 ml ethyl acetate was added over 75 minutes, while the temperature was kept at 0° C. The reaction was allowed to continue for 30 minutes at 0° C. The reaction mixture was heated to room temperature and the organic fraction was isolated. The organic fraction was washed with 500 ml water and 400 ml brine. 4.4 g BHT and 460.8 g tetramethylguanidine were added and the mixture was refluxed for 12 hours. The reaction mixture was allowed to cool down to room temperature and the organic fraction was washed with 1000 ml water and a combination of 1000 ml water and 300 ml brine. Water was removed by azeotropic distillation, followed by further removal of ethyl acetate by distillation. In total 1100 ml ethyl acetate was removed. The mixture was cooled to 10° C. and 600 ml isooctane was added. A small portion of pure phenetyl acrylamide was added, upon which phenetyl acrylamide crystallized. Two fractions of 300 ml isooctane were added and phenetyl acrylamide was allowed to crystallize further. Phenetyl acrylamide was isolated by filtration, washed with isooctane and dried. 236 g (67%) phenetyl acrylamide was isolated.

4. Synthesis of Sulfonamide Monomer-1

The synthesis of the Sulfonamide Monomer-1 has been reported in EP 894 622 (Fuji Photo Film Co.).

5. The Synthesis of the Inventive and Comparative Resins

The Inventive Resins 01-04 according to the present invention and the Comparative Resins 01-04 were prepared according to the following procedure. The monomer composition, the initiation temperature and the molecular weight are given in Tables 1 and 2.

In a 250 ml reactor, the amount of each type of monomers as indicated in Table 4 were added to 35.4 g gamma-butyrolactone and the mixture was heated to 140° C., while stirring at 200 rpm. Upon complete dissolution of the monomer mixture, the reaction mixture was allowed to cool down to the initiation temperature as indicated in Table 4. 80 µl of Trigonox DC50 (commercially available from AKZO NOBEL) was added at once, immediately followed by the addition of 1.121 ml of a 25% solution of Trigonox 141 (commercially available from AKZO NOBEL) in gamma-butyrolactone. After 4 minutes, 410 µl of Trigonox DC50 was added over two hours while the reaction mixture was heated to 140° C. The polymerization was allowed to continue for two hours at 140° C. The reaction mixture was allowed to cool down to 120° C. and 19.6 ml 1-methoxy-2-propanol was added. The reaction mixture was allowed to cool down to room temperature. The reaction mixture was used directly for the preparation of the coating solutions without further purification.

The presence of residual monomer in each of the samples was analyzed, using thin layer chromatography in comparison with original samples of the different monomers. Partisil KC18F plates, supplied by Whatman were used. MeOH/0.5 M NaCl 60/40 was used as eluent. In none of the samples, residual monomer could be detected.

The molecular weight of these polymers ($M_n$, $M_w$, $M_n/M_w$) was analyzed with size exclusion chromatography, using dimethyl acetamide/0.21% LiCl as eluent on a 3× mixed-B column and relative to polystyrene standards. The analytical results, i.e. the monomer composition, initiation temperature and molecular weight of Inventive Resin-01 to Inventive Resin-04 and Comparative Resin-01 to Comparative Resin-08 are given below in Table 4.

TABLE 1

Inv. resins 01-04 and comp. resins 01-08.

| | Sulfonamide Monomer-1 | phenetyl acrylamide | Third monomer |
|---|---|---|---|
| Inventive Resin-01 | Methacrylamide-phenyl-SO$_2$NH$_2$<br>7.57 g | N-phenethyl acrylamide<br>6.13 g | Acrylamide-phenylalanine-oxopropyl ester<br>Monomer-2<br>0.96 g |
| Inventive Resin-02 | Methacrylamide-phenyl-SO$_2$NH$_2$<br>7.57 g | N-phenethyl acrylamide<br>4.91 g | Acrylamide-phenylalanine-oxopropyl ester<br>Monomer-2<br>2.89 g |
| Inventive Resin-03 | Methacrylamide-phenyl-SO$_2$NH$_2$<br>7.57 g | N-phenethyl acrylamide<br>6.13 g | Acrylamide-glycine-oxopropyl ester<br>Monomer-1<br>0.65 g |
| Inventive Resin-04 | Methacrylamide-phenyl-SO$_2$NH$_2$<br>7.57 g | N-phenethyl acrylamide<br>4.91 g | Acrylamide-glycine-oxopropyl ester<br>Monomer-1<br>1.95 g |
| Comparative Resin-01 | Methacrylamide-phenyl-SO$_2$NH$_2$<br>7.57 g | N-phenethyl acrylamide<br>6.13 g | Acrylamide-phenylalanine-OH<br>Comp. Monomer 6<br>0.77 g |
| Comparative Resin-02 | Methacrylamide-phenyl-SO$_2$NH$_2$<br>7.57 g | N-phenethyl acrylamide<br>6.13 g | Acrylamide-phenylalanine-OEt<br>Comp. Monomer 4<br>0.87 g |

TABLE 2

Analytical results.

| | Initiation T °C. | $M_n$ | $M_w$ | $M_w/M_n$ |
|---|---|---|---|---|
| Inv. Resin-01 | 100 | 39557 | 132083 | 3.34 |
| Inv. Resin-02 | 100 | 41333 | 154631 | 3.74 |
| Inv. Resin-03 | 106 | 38977 | 105737 | 2.71 |
| Inv. Resin-04 | 108 | 37983 | 76919 | 2.03 |
| Comparative Resin-01 | 100 | 36956 | 105225 | 2.85 |
| Comparative Resin-02 | 100 | 43308 | 140914 | 3.25 |
| Comparative Resin-03 | 100 | 40720 | 104132 | 2.56 |
| Comparative Resin-04 | 100 | 36148 | 85882 | 2.38 |
| Comparative Resin-05 | 110 | 31770 | 59947 | 1.89 |
| Comparative Resin-06 | 110 | 28077 | 56026 | 2.00 |
| Comparative Resin-07 | 110 | 28571 | 71970 | 2.52 |
| Comparative Resin-08 | 110 | 27893 | 45558 | 1.63 |

6. Preparation of the Lithographic Support S-01

A 0.3 mm thick aluminium foil was degreased by spraying with an aqueous solution containing 34 g/l NaOH at 70° C. for 6 seconds and rinsed with demineralised water for 3.6 seconds. The foil was then electrochemically grained during 8 seconds using an alternating current in an aqueous solution containing 15 g/l HCl, 15 g/l $SO_4^{2-}$ ions and 5 g/l $Al^{3+}$ ions at a temperature of 37° C. and a current density of about 100 $A/dm^2$ (charge density of about 800 $C/dm^2$). Afterwards, the aluminium foil was desmutted by etching with an aqueous solution containing 6.5 g/l of NaOH at 35° C. for 5 seconds and rinsed with demineralised water for 4 seconds. The foil was subsequently subjected to anodic oxidation during 10 seconds in an aqueous solution containing 145 g/l of sulfuric acid at a temperature of 57° C. and a current density of 33 $A/dm^2$ (charge density of 330 $C/dm^2$), then washed with demineralised water for 7 seconds and post-treated for 4 seconds (by spray) with a solution containing 2.2 g/l polyvinylphosphonic acid at 70° C., rinsed with demineralised water for 3.5 seconds and dried at 120° C. for 7 seconds.

The support thus obtained was characterised by a surface roughness Ra of 0.35-0.4 μm (measured with interferometer NT1100) and an anodic weight of 3.0 $g/m^2$.

7. Preparation of the Printing Plate Precursors PPP-01 to 12

Coating Step.

The printing plate precursors were produced by coating a coating solution onto the above described lithographic support S-01. The coating solution contains the ingredients as defined in Table 3, dissolved in a mixture of the following solvents: 53% by volume of tetrahydrofuran, 20% by volume of Dowanol PM, which is 1-methoxy-2-propanol, commercially available from DOW CHEMICAL Company, and 27% by volume of gamma-butyrolactone. The coating was applied at a wet coating thickness of 20 μm and then dried at 135° C. for 3 minutes. The dry coating weight amount in $g/m^2$ of each of the ingredients is indicated in Table 3.

TABLE 3

Coating composition.

| INGREDIENTS | Dry coating weight amount $g/m^2$ |
|---|---|
| Inventive Resin-0X or Comparative Resin-0x (1) | 0.810 |
| SOO94 (2) | 0.021 |
| Crystal Violet (3) | 0.012 |
| Tegoglide 410 (4) | 0.0017 |

(1) See Tables 1 and 2;
(2) SOO94 is an IR absorbing cyanine dye, commercially available from FEW CHEMICALS; the chemical structure of SOO94 is

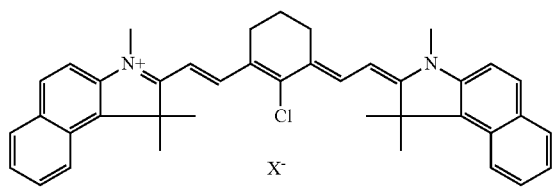 [SMILES: CN1/C(=C/C=C2\CCCC(/C=C/C3=[N+](C)c4ccc5ccccc5c4C3(C)C)=C2Cl)C(C)(C)c2c1ccc1ccccc21 ; "X-"]

having a tosylate counter ion ($X^-$);
(3) Crystal Violet, commercially available from CIBA-GEIGY;
(4) TEGOGLIDE 410 is a copolymer of polysiloxane and poly(alkylene oxide), commercially available from TEGO CHEMIE SERVICE GmbH.

Exposure Step.

The obtained printing plate precursors 01-12 were exposed with a Creo Trendsetter 3244 platesetter, trademark from CREO (Barnaby, Canada), having a 20 W thermal head, operating at 150 rpm and with an energy density of 140 $mJ/cm^2$.

The obtained printing plate precursors 01-12 are summarized in Table 4.

TABLE 4

Printing plate precursors 01-12.

| | PPP |
|---|---|
| Inv. Resin-01 | PPP-01, inventive |
| Inv. Resin-02 | PPP-02, inventive |
| Inv. Resin-03 | PPP-03, inventive |
| Inv. Resin-04 | PPP-04, inventive |
| Comparative Resin-01 | PPP-05, comparative |
| Comparative Resin-02 | PPP-06, comparative |
| Comparative Resin-03 | PPP-07, comparative |
| Comparative Resin-04 | PPP-08, comparative |
| Comparative Resin-05 | PPP-09, comparative |
| Comparative Resin-06 | PPP-10, comparative |
| Comparative Resin-07 | PPP-11, comparative |
| Comparative Resin-08 | PPP-12, comparative |

8. Lithographic Contrast and Determination of the Reference Developing Solutions In order to obtain a printing plate with a high lithographic quality and/or printing performance—i.e. a lithographic printing plate showing no stain on the plate and no toning during the printing process—the difference in optical density measured at the image areas (non-exposed) areas and the non-image (exposed) areas should be as large as possible. In addition, the optical density of the non-image areas should be as low as possible. This difference in optical density of the image and non-image areas, is called herein the lithographic contrast.

The optical density of the non-image areas ($OD_{min}$) and the optical density of the image areas ($OD_{max}$) were measured with a GretagMacbeth D19C densitometer, commercially available from Gretag-Macbeth AG, with the uncoated support as reference.

In order to be able to compare the lithographic contrast of different printing plates, the printing plate precursors should have a similar dissolution behaviour in the alkaline developing solution. The precursors as described in the Examples have a different coating composition and thus show different dissolution kinetics in an alkaline developing solution. Therefore, the developing force, i.e. the amount of alkali in the developer, has been adapted for each precursor in order to obtain comparable dissolution kinetics for each precursor. The required amount of alkali in the developing solution has been determined for each precursor by the following method.

Method for Determining the Reference Developing Solution for Each Printing Plate Precursor.

The image-wise exposed precursor is developed by dipping the precursor in the developer DEV-01, as defined in Table 4, at a temperature of 25° C. during a dwell time of 10 seconds. Subsequently the $OD_{max}$ and $OD_{min}$ values are measured. This test is repeated several times and each time the developer (having initially a conductivity of $17.10^{-3}$ S/cm (17 mS/cm) is concentrated progressively by adding a solution of 50% by weight of KOH in small amounts until the exposed and developed precursor shows a value for $OD_{rain}$ of 40% of the $OD_{max}$ value. In Tables 5 to 8 the conductivity of the developing solution after concentration with KOH is indicated for each printing plate precursor.

TABLE 4

Composition of the developing solution DEV-01.

| INGREDIENTS | DEV-01 (g) |
|---|---|
| Sorbitol (1) | 67.3 |
| K-citrate (2) | 12.75 |
| Mackam 2CSF (3) | 0.3 |
| Synperonic T304 (4) | 1.025 |
| Dequest 2060S (5) | 0.11 |
| Surfynol 104H (6) | 0.17 |
| KOH (aqueous solution 50% by weight) | 5.24 |
| Water until | 1000 |
| Conductivity, measured at 25° C. (mS/cm) | 17 |

TABLE 4-continued

Composition of the developing solution DEV-01.

(1) Sorbitol has the structure of and is commercially available from ROQUETTE FRERES SA.
(2) K-citrate represents tri-potassium citrate monohydrate, commercially available from MERCK.
(3) Mackam 2CSF has the structure of and is commercially available from CALDIC CHEMIE NV.
(4) Synperonic T304 is a block-co-polymer of polyethylene oxide (=PEO) and polypropylene oxide (=PPO) attached to ethylenediamine (=EDA) in a ratio EDA/PEO/PPO of 1/15/14 and having a mean molecular weight of 1600, commercially available from UNIQEMA.
(5) Dequest 2060S has the structure of commercially available from MONSANTO SOLUTIA EUROPE.
(6) Surfynol 104H is a surfactant having the structure of and is commercially available from KEYSER&MACKAY, supplied by AIR PRODUCTS&CHEMICALS.

9. Development Step

Each imagewise exposed printing plate precursor 01-12 was developed by dipping the precursor in its reference developing solution—defined as described above—at a temperature of 25° C. during a dwell time of 50 seconds. The corresponding printing plates 01-12 were obtained.

10. Results of the Lithographic Contrast

In accordance with the present invention, the lithographic contrast—i.e. the difference between the optical density at the non-exposed areas ($OD_{max}$) and the exposed areas ($OD_{min}$)—under these processing conditions should be 0.65 or more, and the $OD_{min}$ value at the exposed areas should be equal to or lower than 0.1.

The $OD_{max}$ and $OD_{min}$ values of the obtained printing plates 01-12 were measured and the results are indicated in Tables 5 to 8.

The results illustrate that the plates PP-01 to PP-04 comprising the Inventive Resins-01 to 04 have an increased contrast ≥0.65 (dwell time: 50 seconds) at $OD_{min}$≤0.1.

TABLE 5

Optical density (OD) of Inv. PP-01 and Comp. PP-05 and 06.

| Printing Plates | $OD_{min}$* | Lithographic Contrast* $OD_{max} - OD_{min}$ | Conductivity** mS/cm |
|---|---|---|---|
| Inv. PP-01 | 0.098 | 0.70 | 59.3 |
| Comp. PP-05 | 0.054 | 0.50 | 40.7 |
| Comp. PP-06 | 0.039 | 0.52 | 60.6 |

*dwell time 50 s;
**conductivity of the reference developing solution as determined according to the method described above.

TABLE 6

Optical density (OD) of Inv. PP-02 and Comp. PP-07 and 08.

| Resin | $OD_{min}$* | Lithographic Contrast* $OD_{max} - OD_{min}$ | Conductivity** mS/cm |
|---|---|---|---|
| Inv. PP-02 | 0.024 | 0.65 | 69.1 |
| Comp. PP-07 | 0.154 | 0.39 | 16.6 |
| Comp. PP-08 | 0.038 | 0.60 | 63.2 |

*dwell time 50 s;
**conductivity of the reference developing solution as determined according to the method described above.

TABLE 7

Optical density (OD) of Inv. PP-03 and Comp. PP-09 and 10.

| Resin | $OD_{min}$* | Lithographic Contrast* $OD_{max} - OD_{min}$ | Conductivity** mS/cm |
|---|---|---|---|
| Inv. PP-03 | 0.08 | 0.74 | 50.9 |
| Comp. PP-09 | 0.066 | 0.46 | 35.5 |
| Comp. PP-10 | 0.12 | 0.67 | 50.3 |

*dwell time 50 s
**conductivity of the reference developing solution as determined according to the method described above;

TABLE 8

Optical density (OD) of Inv. PP-04 and Comp. PP-11 and 12.

| Resin | $OD_{min}$* | Lithographic Contrast* $OD_{max} - OD_{min}$ | Conductivity** mS/cm |
|---|---|---|---|
| PP-04 | 0.077 | 0.69 | 39.5 |
| Comp. PP-11*** | — | — | — |
| Comp. PP-12 | 0.059 | 0.47 | 44.7 |

*dwell time 50 s;
**conductivity of the reference developing solution as determined according to the method described above;
***Solubility problem of the coating formulation.

The invention claimed is:

1. An alkali soluble resin comprising a first monomeric unit including at least one sulfonamide group and a second monomeric unit derived from the monomer according to the following structure:

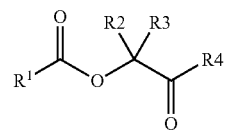

wherein $R^1$ represents a structural moiety comprising an ethylenically unsaturated polymerisable group;

$R^2$, $R^3$ and $R^4$ independently represent hydrogen, an optionally substituted alkyl group, cycloalkyl group, alkenyl, alkynyl, alkaryl or aralkyl group, an optionally substituted aryl or heteroaryl aryl group; or the necessary atoms to form a five to eight membered ring.

2. An alkali soluble resin according to claim 1 wherein the ethylenically unsaturated polymerisable group represents an acrylate, a methacrylate, a styrene, a maleimide, an acrylamide or a methacrylamide group.

3. An alkali soluble resin according to claim 1 wherein the second monomeric unit is derived from the monomer according to the following structure:

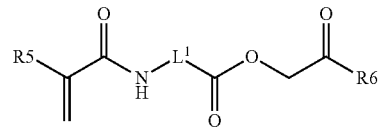

wherein $R^5$ represents hydrogen or an optionally substituted alkyl group;

$R^6$ represents an optionally substituted alkyl, aryl or heteroaryl group, and $L^1$ represents a divalent linking group.

4. An alkali soluble resin according to claim 1 wherein the second monomeric unit is derived from the monomers selected from the following list:

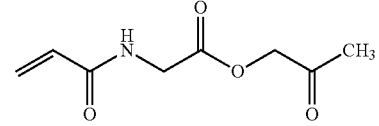

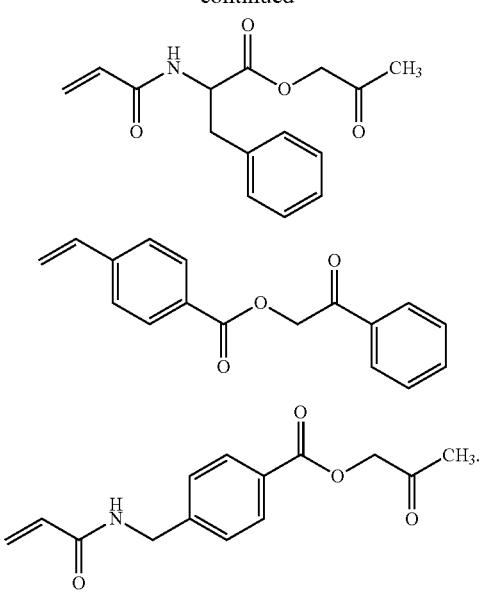

5. An alkali soluble resin according to claim 1 wherein the first monomeric unit comprises a sulphonamide group represented by —NR$^j$—SO$_2$—, —SO$_2$—NR$^k$— wherein R$^j$ and R$^k$ each independently represent hydrogen, an optionally substituted alkyl, alkanoyl, alkenyl, alkynyl, cycloalkyl, heterocyclic, aryl, heteroaryl, aralkyl, heteroaralkyl group or combinations thereof.

6. An alkali soluble resin according to claim 1 wherein the first monomeric unit comprising a sulfonamide group is derived from the monomer according to the following structure:

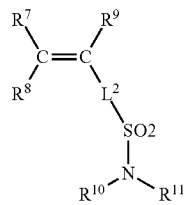

wherein

R$^7$, R$^8$ and R$^9$ independently represent hydrogen or an optionally substituted alkyl or aryl group;

L$^2$ represents a divalent linking group;

R$^{10}$ and R$^{11}$ represent hydrogen, an optionally substituted alkyl, alkenyl, alkynyl, alkaryl, aralkyl, aryl, or heteroaryl group.

7. An alkali soluble resin according to claim 1 wherein the first monomeric unit comprising a sulfonamide group is derived from the monomer according to the following structure:

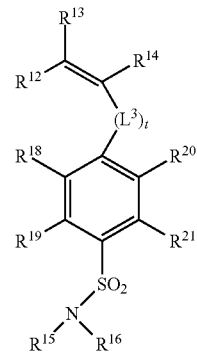

wherein

R$^{12}$, R$^{13}$ and R$^{14}$ independently represent hydrogen or an optionally substituted alkyl group;

L$^3$ represents a divalent linking group;

t represents 0, 1 or an integer greater than 1;

R$^{15}$ and R$^{16}$ represent hydrogen, an optionally substituted alkyl, alkenyl, alkynyl, alkaryl, aralkyl, aryl or heteroaryl group; and R$^{18}$, R$^{19}$, R$^{20}$ and R$^{21}$ independently represent an alkyl, cycloalkyl, alkenyl or cyclo alkenyl group, an alkoxy group, a thio alkyl group, a hydroxyl group, —SH, a carboxylic acid group or an alkyl ester thereof, a sulphonic acid group or an alkyl ester thereof, a phosphonic acid group or an alkyl ester thereof, a phosphoric acid group or an alkyl ester thereof, an amino group, a sulphonamide group, an amide group, a nitro group, a nitrile group or a halogen.

8. An alkali soluble resin according to claim 1 wherein the first monomeric unit comprising a sulfonamide group is derived from the monomer according to the following structure:

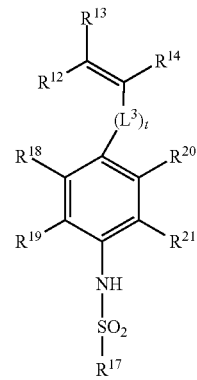

wherein

R$^{12}$, R$^{13}$ and R$^{14}$ independently represent hydrogen or an optionally substituted alkyl group;

L$^3$ represents a divalent linking group;

t represents 0, 1 or an integer greater than 1;

R$^{17}$ represent an optionally substituted alkyl, alkenyl, alkynyl, alkaryl, aralkyl group, an optionally substituted cycloalkyl group such as a cyclopentyl, cyclohexyl, 1,3-dimethylcyclohexyl group, an optionally substituted aryl group such as benzene, naphthalene or antracene or an optionally substituted heteroaryl aryl group such as furan, thiophene, pyrrole, pyrazole, imidazole, 1,2,3-triazole, 1,2,4-triazole, tetrazole, oxazole, isoxazole, thiazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole;

$R^{18}$, $R^{19}$, $R^{20}$ and $R^{21}$ independently represent an alkyl, cycloalkyl, alkenyl or cyclo alkenyl group, an alkoxy group, a thio alkyl group, a hydroxyl group, —SH, a carboxylic acid group or an alkyl ester thereof, a sulphonic acid group or an alkyl ester thereof, a phosphonic acid group or an alkyl ester thereof, a phosphoric acid group or an alkyl ester thereof, an amino group, a sulphonamide group, an amide group, a nitro group, a nitrile group or a halogen.

9. An alkali soluble resin according to claim 3 wherein the first monomeric unit comprising a sulfonamide group is derived from the monomer according to the following structure:

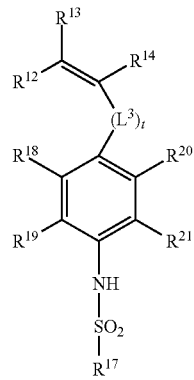

wherein
$R^{12}$, $R^{13}$ and $R^{14}$ independently represent hydrogen or an optionally substituted alkyl group;
$L^3$ represents a divalent linking group;
t represents 0, 1 or an integer greater than 1;
$R^{17}$ represent an optionally substituted alkyl, alkenyl, alkynyl, alkaryl, aralkyl group, an optionally substituted cycloalkyl group such as a cyclopentyl, cyclohexyl, 1,3-dimethylcyclohexyl group, an optionally substituted aryl group such as benzene, naphthalene or antracene or an optionally substituted heteroaryl aryl group such as furan, thiophene, pyrrole, pyrazole, imidazole, 1,2,3-triazole, 1,2,4-triazole, tetrazole, oxazole, isoxazole, thiazole, isothiazole, thiadiazole, oxadiazole, pyridine, pyridazine, pyrimidine, pyrazine, 1,3,5-triazine, 1,2,4-triazine or 1,2,3-triazine, benzofuran, benzothiophene, indole, indazole, benzoxazole, quinoline, quinazoline, benzimidazole or benztriazole;

$R^{18}$, $R^{19}$, $R^{20}$ and $R^{21}$ independently represent an alkyl, cycloalkyl, alkenyl or cyclo alkenyl group, an alkoxy group, a thio alkyl group, a hydroxyl group, —SH, a carboxylic acid group or an alkyl ester thereof, a sulphonic acid group or an alkyl ester thereof, a phosphonic acid group or an alkyl ester thereof, a phosphoric acid group or an alkyl ester thereof, an amino group, a sulphonamide group, an amide group, a nitro group, a nitrile group or a halogen.

10. An alkali soluble resin according to claim 1 wherein the first monomeric unit comprising a sulfonamide group is derived from the monomers selected from the following monomers:

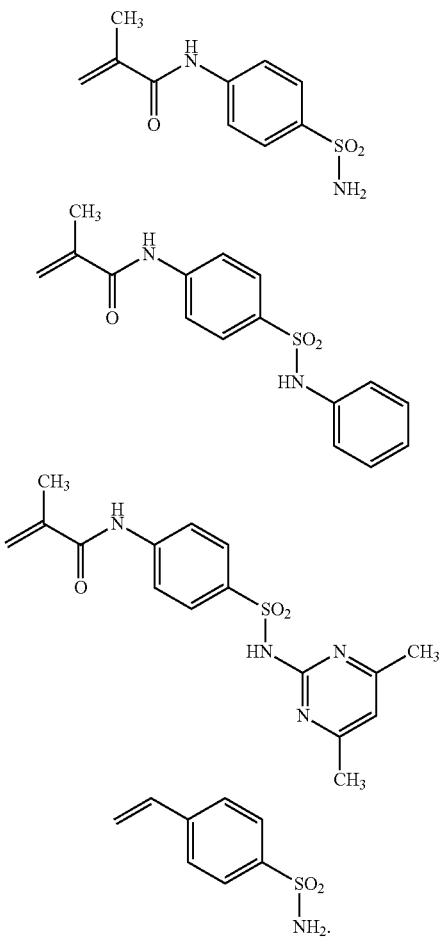

11. An alkali soluble resin according to claim 1 further comprising one or more monomeric unit(s) derived from the monomers selected from an alkyl or aryl (meth)acrylate, (meth)acrylic acid, (meth)acrylamide, a N-alkyl or N-aryl (meth)acrylamide, (meth)acrylonitrile, styrene, vinylpyridine, vinyl acetate, vinyl alcohol, vinyl acetal, vinyl butyral, a vinyl ether, vinyl amide, caprolactame, vinyl pyrrolydone or maleimide.

12. A method comprising the step of utilizing an alkali soluble resin according to claim 1 to make a lithographic printing plate.

13. A positive-working lithographic printing plate precursor which comprises on a support having a hydrophilic surface or which is provided with a hydrophilic layer, a heat and/or light-sensitive coating including an infrared absorbing agent and a first layer comprising an alkaline soluble resin according to claim 1.

14. A positive-working lithographic printing plate precursor which comprises on a support having a hydrophilic surface or which is provided with a hydrophilic layer, a heat and/or light-sensitive coating including an infrared absorbing agent and a first layer comprising an alkaline soluble resin according to claim 3.

15. A positive-working lithographic printing plate precursor which comprises on a support having a hydrophilic surface or which is provided with a hydrophilic layer, a heat and/or light-sensitive coating including an infrared absorbing agent and a first layer comprising an alkaline soluble resin according to claim 9.

16. A positive-working lithographic printing plate precursor according to claim 13 wherein the coating comprises on top of the first layer a second layer comprising a phenolic resin.

17. A positive-working lithographic printing plate precursor according to claim 15 wherein the coating comprises on top of the first layer a second layer comprising a phenolic resin.

18. A method for making a positive-working lithographic printing plate comprising the steps of:
- providing a heat-sensitive lithographic printing plate precursor according to claim 16;
- imagewise exposing the heat-sensitive lithographic printing plate precursor to heat and/or infrared light;
- developing said imagewise exposed precursor with an aqueous alkaline developer so that the exposed areas are dissolved.

19. A method for making a positive-working lithographic printing plate comprising the steps of:
- providing a heat-sensitive lithographic printing plate precursor according to claim 17;
- imagewise exposing the heat-sensitive lithographic printing plate precursor to heat and/or infrared light;
- developing said imagewise exposed precursor with an aqueous alkaline developer so that the exposed areas are dissolved.

20. A method of lithographic printing comprising the steps of:
- (i) providing a printing plate according to claim 18;
- (ii) mounting the obtained printing plate on a press and start printing by applying ink and/or dampening liquid.

* * * * *